United States Patent [19]
Otsuji et al.

[11] Patent Number: 6,028,161
[45] Date of Patent: Feb. 22, 2000

[54] POLYCARBONATE COPOLYMER AND APPLICATIONS THEREOF

[75] Inventors: Atsuo Otsuji; Rihoko Suzuki; Kenichi Sugimoto; Tatsuhiro Urakami; Keisuke Takuma, all of Kanagawa, Japan

[73] Assignee: Mitsui Chemicals, Inc., Japan

[21] Appl. No.: 09/213,432

[22] Filed: Dec. 17, 1998

[30] Foreign Application Priority Data

Dec. 25, 1997 [JP] Japan .................................. 9-357664
Apr. 21, 1998 [JP] Japan .................................. 10-110361

[51] Int. Cl.$^7$ .................................................. C08G 64/00
[52] U.S. Cl. .......................... 528/196; 528/198; 528/372
[58] Field of Search ..................... 528/196, 198, 528/372

[56] References Cited

U.S. PATENT DOCUMENTS 4,950,731  8/1990  Faler et al. .............................. 528/201

FOREIGN PATENT DOCUMENTS 7-330884  12/1995  Japan .

*Primary Examiner*—Terressa Mosley-Boykin
*Attorney, Agent, or Firm*—Burns, Doane, Swecker & Mathis, L.L.P.

[57] ABSTRACT

A polycarbonate copolymer comprising the repeating structural unit represented by general formula (1-a) and at least one of the repeating structural units represented by general formulas (2-a) and (3-a) is provided.

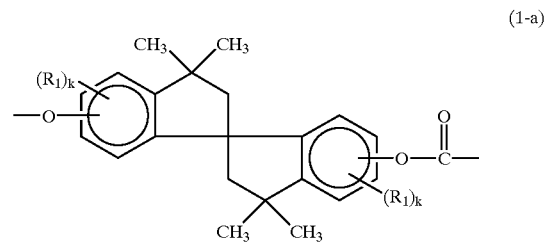

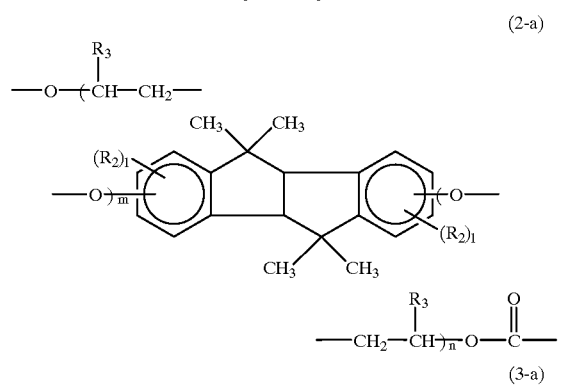

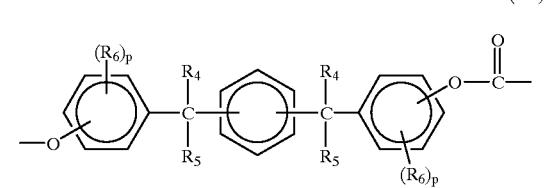

16 Claims, No Drawings

POLYCARBONATE COPOLYMER AND APPLICATIONS THEREOF

BACKGROUND OF THE INVENTION

1. Field of the Invention

This invention relates to a polycarbonate copolymer and an organic optical component made from the polycarbonate. The polycarbonate copolymer of this invention has excellent transparency, heat resistance and mechanical properties and a low birefringence, as well as good melt fluidity and moldability. The polycarbonate copolymer of this invention is useful for an optical component; typically a substrate for an optical disk, a pick-up lens and an optical fiber.

2. Description of the Related Art

A polycarbonate is widely used as an engineering plastic in the fields of automobile, electronics and optics. Currently, a polycarbonate widely used is generally prepared from 2,2'-bis(4'-hydroxyphenyl)propane(hereinafter, referred to as bisphenol A) and a halogenated carbonyl compound such as phosgene. A polycarbonate from bisphenol A is a resin having well-balanced properties such as transparency, heat resistance, a lower moisture permeability, shock resistance and dimensional stability. It is, therefore, widely used, and in particular has been recently used in the field of optical components such as a substrate for an optical disk.

In an optical disk used as an information recording medium, a laser beam passes through the disk body. Thus, the disk is required to be, of course, transparent, and is strongly required to be optically isotropic for reducing reading errors of information.

However, for example, when using a polycarbonate from bisphenol A, there occurs a problem that a residual stress generated by some factors such as thermal stress, molecular orientation and volume variation near a glass-transition temperature generated by cooling and fluidizing processes of a resin during casting a disk substrate, may cause a birefringence when a laser beam passes through the disk substrate. Large optical anisotropy due to the birefringence may become a fatal defect for an optical component such as an optical disk substrate because it may cause significant problems such as reading errors of a recorded information. Furthermore, due to having a higher melt viscosity, the polycarbonate exhibits poor moldability, e.g., it may be quite difficult to provide a disk substrate with a narrower track pitch and a shorter pit diameter for improving a recording density by injection molding.

A variety of new polymers have been disclosed for solving the above problems, e.g., a polycarbonate from spirobiindanol alone and a polycarbonate copolymer from spirobiindanol and bisphenol A (for example, U.S. Pat. No. 4,950,731).

Although having a low birefringence, the former polycarbonate is practically problematic due to its poor transparency and mechanical strength; for example, it may have cracks during molding. The latter polycarbonate, increase of bisphenol A ratio improves transparency and mechanical strength, but increases the birefringence, which limits its applications as an optical component for, e.g., the above information recording medium.

A polycarbonate copolymer (alternating copolymer) from spirobiindanol and bisphenols of specific structure has been disclosed in JP-A HEI7-330884. However optical properties of the polycarbonate such as birefringence is not mentioned. The use of the polycarbonate for optical components such as information recording medium is practically problematic due to its high birefringence.

Furthermore, compared with a polycarbonate from the existing bisphenol A, these polycarbonates does not have a practically sufficient melt fluidity for providing a disk substrate for an information recording medium which is required to have the above precise processability, by injection molding. Thus, it has been strongly desired to solve these problems.

SUMMARY OF THE INVENTION

An objective of this invention is to provide a polycarbonate copolymer which can solve the above problems and be useful for an optical component, having good transparency, heat resistance and mechanical properties and also a low birefringence, as well as good melt fluidity and moldability.

We have intensively attempted to solve the above problems and have finally realized this invention. Specifically, this invention provides the followings;

(i) a polycarbonate copolymer comprising the repeating structural unit represented by general formula (1-a) and at least one of the repeating structural units represented by general formulas (2-a) and (3-a);

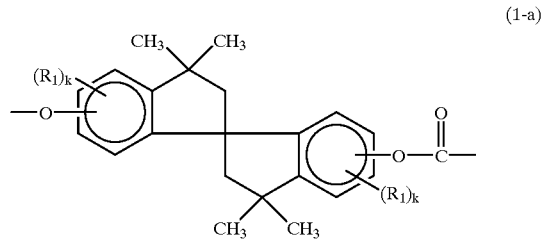

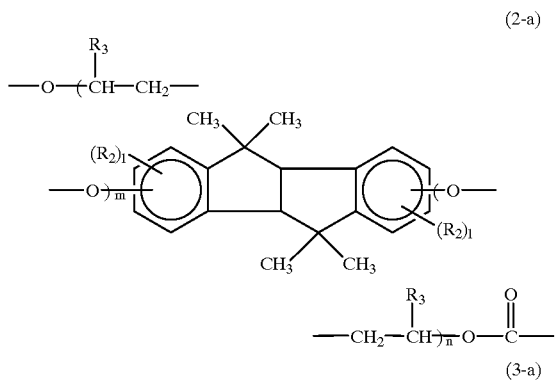

wherein $R_1$ and $R_2$ are independently an alkyl, an alkoxy, nitro or a halogen atom; $R_3$ is hydrogen or methyl; $R_4$ and $R_5$ are independently hydrogen or an alkyl; $R_6$ is independently an alkyl, an alkoxy or a halogen atom; k and l are independently an integer of 0 to 3; m and n are independently an integer of 0 to 20; and p is independently an integer of 0 to 2, although m+n is not 0;

(ii) a polycarbonate copolymer described in (i) comprising the repeating structural units represented by general formulas (1-a) and (2-a), where the repeating structural unit represented by (2-a) is contained in a proportion of 5 to 90 mol % in the total repeating structural units represented by general formulas (1-a) and (2-a);

(iii) a polycarbonate copolymer described in (i) comprising the repeating structural units represented by general formulas (1-a) and (3-a), where the repeating structural unit represented by (1-a) is contained in a proportion of 5 to 90 mol % in the total repeating structural units represented by general formulas (1-a) and (3-a);

(iv) a polycarbonate copolymer described in (i), (ii) or (iii) whose weight average molecular weight is 10,000 to 150,000;

(v) a polycarbonate copolymer described in (ii) where k is 0 in general formula (1-a) and l is 0 in general formula (2-a);

(vi) a polycarbonate copolymer described in (iii) where k is 0 in general formula (1-a) and the repeating structural unit of general formula (3-a) is represented by formula (3-a-1);

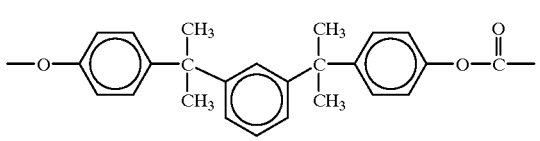

and (vii) an optical component comprising a polycarbonate copolymer described in any of (i) to (vi).

This invention provides a polycarbonate copolymer having good properties such as transparency and heat resistance and also a low birefringence. The polycarbonate copolymer has better melt fluidity and moldability than a known polycarbonate from bisphenol A.

The polycarbonate copolymer of this invention is very useful as an optical component such as a substrate for an optical disk and a pick-up lens. In particular, a substrate for an optical disk from the polycarbonate has good optical recording properties and durability (for example, heat resistance and moisture resistance).

DETAILED DESCRIPTION OF THE PREFERRED EMBODIMENTS

This invention will be detailed.

The polycarbonate copolymer of this invention may be prepared by copolymerizing a dihydroxy compound represented by general formula (1) and at least one of dihydroxy compounds represented by general formulas (2) and (3) with a carbonate precursor, as will be detailed later;

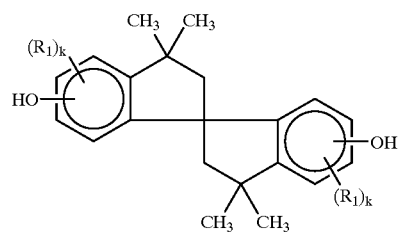 (1)

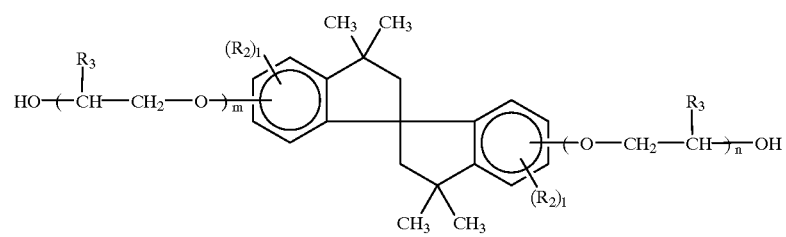 (2)

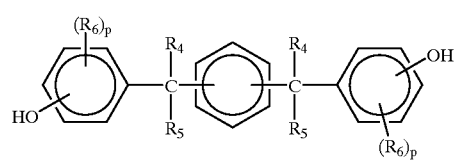 (3)

where $R_1$ to $R_6$, k, l, m, n and p are as defined above.

The polycarbonate copolymer of this invention consists essentially of the repeating structural unit represented by general formula (1-a) derived from a compound represented by general formula (1) with a carbonate precursor and at least one of the repeating structural units represented by general formulas (2-a) and (3-a) derived from compounds represented by general formula (2) and (3), respectively, with a carbonate precursor.

In the general formulas, $R_1$ and $R_2$ are independently an alkyl, an alkoxy, nitro or a halogen atom; preferably an optionally substituted straight, branched or cyclic alkyl, an optionally substituted straight, branched or cyclic alkoxy, nitro or a halogen atom; and more preferably an optionally substituted straight, branched or cyclic alkyl with 1 to 20 carbon atoms, an optionally substituted straight, branched or cyclic alkoxy with 1 to 20 carbon atoms, nitro or a halogen.

Substituents in the alkyl or alkoxy in $R_1$ and $R_2$ include an alkoxy, an alkoxyalkoxy, a cycloalkyl, a heteroatom-containing cycloalkyl, a cycloalkoxy, a heteroatom-containing cycloalkoxy, an aryloxy, an aryloxyalkoxy and a halogen atom.

Specific examples for the substituents $R_1$ and $R_2$ include methyl, ethyl, n-propyl, isopropyl, n-butyl, isobutyl, sec-butyl, tert-butyl, n-pentyl, n-hexyl, 2-ethylhexyl, n-octyl, n-decyl, n-dodecyl, n-tetradecyl, n-octadecyl, cyclopentyl, cyclohexyl, 4-tert-butylcyclohexyl, cycloheptyl, cyclooctyl, cyclohexylmethyl, cyclohexylethyl, tetrahydrofurfuryl, 2-methoxyethyl, 2-ethoxyethyl, 2-n-butoxyethyl, 3-methoxypropyl, 3-ethoxypropyl, 3-n-propoxypropyl, 3-n-butoxypropyl, 3-n-hexyloxypropyl, 2-methoxyethoxyethyl, 2-ethoxyethoxyethyl, 2-phenoxymethyl, 2-phenoxyethoxyethyl, chloromethyl, 2-chloroethyl, 3-chloropropyl, 2,2,2-trichloroethyl, trifluoromethyl, methoxy, ethoxy, n-propoxy, isopropoxy, n-butoxy, isobutoxy, sec-butoxy, n-pentyloxy, n-hexyloxy, 2-ethylhexyloxy, n-octyloxy, n-decyloxy, n-dodecyloxy, n-tetradecyloxy, n-octadecyloxy, cyclopentyloxy, cyclohexyloxy, 4-tert-butylcyclohexyloxy, cycloheptyloxy, cyclooctyloxy, cyclohexylmethoxy, cyclohexylethoxy, 2-methoxyethoxy, 2-ethoxyethoxy, 2-n-butoxyethoxy, 3-methoxypropoxy, 3-ethoxypropoxy, 3-n-propoxypropoxy, 3-n-butoxypropoxy, 3-n-hexyloxypropoxy, 2-methoxyethoxyethoxy, 2-phenoxymethoxy, 2-phenoxyethoxyethoxy, chloromethoxy, 2-chloroethoxy, 3-chloropropoxy, 2,2,2-trichloroethoxy, nitro, fluorine, chlorine, bromine and iodine.

The substituents $R_1$ and $R_2$ are preferably an unsubstituted straight or branched alkyl with 1 to 10 carbon atoms, an unsubstituted straight or branched alkoxy with 1 to 10 carbon atoms, fluorine or chlorine; more preferably methyl, ethyl, n-propyl, isopropyl, n-butyl, isobutyl, tert-butyl, methoxy, ethoxy, n-propoxy, isopropoxy, n-butoxy, isobutoxy, tert-butoxy, fluorine or chlorine; most preferably methyl or fluorine.

In the above formulas, $R_3$ is hydrogen or methyl.

In the above formulas, $R_4$ and $R_5$ are independently hydrogen or an alkyl.

Specific examples for the substituents $R_4$ and $R_5$ include hydrogen, methyl, ethyl, n-propyl, isopropyl, n-butyl, isobutyl, sec-butyl, tert-butyl, n-pentyl, n-hexyl, 2-ethylhexyl, n-octyl, n-decyl, n-dodecyl, n-tetradecyl, n-octadecyl, cyclopentyl, cyclohexyl, 4-tert-butylcyclohexyl and trifluoromethyl.

The substituents $R_4$ and $R_5$ are preferably hydrogen or a straight, branched or cyclic alkyl with 1 to 10 carbon atoms; more preferably, hydrogen or a straight alkyl with 1 to 4 carbon atoms; and most preferably methyl.

In the above formulas, $R_6$ is independently an alkyl, an alkoxy or a halogen atom; preferably an optionally substituted straight, branched or cyclic alkyl, an optionally substituted straight, branched or cyclic alkoxy, or a halogen atom; more preferably an optionally substituted straight, branched or cyclic alkyl with 1 to 20 carbon atoms, an optionally substituted straight, branched or cyclic alkoxy with 1 to 20 carbon atoms, or a halogen atom.

Substituents in the alkyl or alkoxy in $R_6$ include an alkoxy, an alkoxyalkoxy, a cycloalkyl, a heteroatom-containing cycloalkyl, a cycloalkoxy, a heteroatom-containing cycloalkoxy, an aryloxy, an aryloxyalkoxy and a halogen atom.

Specific examples for the substituent $R_6$ are the same as those described for $R_1$ and $R_2$.

The substituent $R_6$ is preferably an unsubstituted straight or branched alkyl with 1 to 10 carbon atoms, an unsubstituted straight or branched alkoxy with 1 to 10 carbon atoms, fluorine or chlorine; more preferably methyl, ethyl, n-propyl, isopropyl, n-butyl, isobutyl, tert-butyl, methoxy, ethoxy, n-propoxy, isopropoxy, n-butoxy, isobutoxy, tert-butoxy, fluorine or chlorine; most preferably methyl or fluorine.

In the above formulas, k and l are independently an integer of 0 to 3; preferably 0, 1 or 2; more preferably 0 or 1; and most preferably 0.

In the above formulas, m and n are independently an integer of 0 to 20; preferably an integer of 0 to 10; more preferably an integer of 0 to 5; more preferably an integer of 0 to 2; and most preferably 1, although m+n is not 0.

In the above formulas, p is independently an integer of 0 to 2; more preferably 0 or 1; and most preferably 0.

In the repeating structural unit represented by general formula (1-a) or (2-a), a carbonate bond or a substituent having a carbonate bond is at position 4, 5, 6 or 7, or position 4', 5', 6' or 7', respectively, of a benzene ring in the spirobiindane structure.

The repeating structural unit represented by general formula (1-a) or (2-a) is preferably the unit represented by formula (1-a-A) or (2-a-A), respectively. In addition, the repeating structural unit represented by general formula (3-a) is preferably the unit represented by formula (3-a-A), particularly by formula (3-a-1).

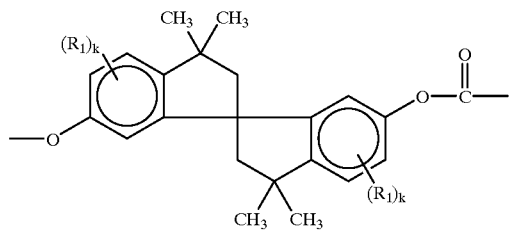

(1-a-A)

-continued

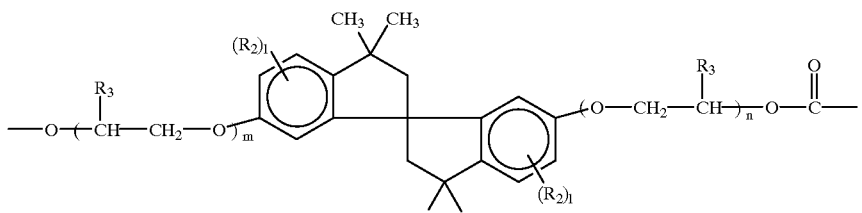

(2-a-A)

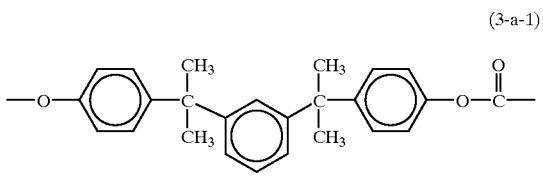

(3-a-A)

where $R_1$ to $R_6$, k, l, m, n and p are as defined above.

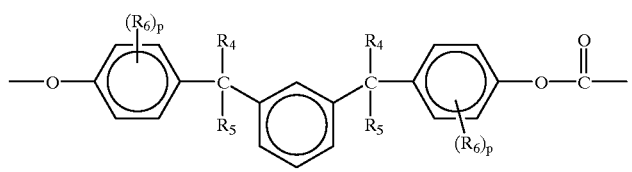

(3-a-1)

A dihydroxy compound represented by general formula (1) as a material for the polycarbonate copolymer of this invention may be selected from, but of course not limited to, the following exemplary compounds;

1. 6,6'-dihydroxy-3,3,3',3'-tetramethyl-1,1'-spirobiindane;
2. 6,6'-dihydroxy-3,3,3',3',5,5'-hexamethyl-1,1'-spirobiindane;
3. 6,6'-dihydroxy-5,5'-diethyl-3,3,3',3'-tetramethyl-1,1'-spirobiindane;
4. 6,6'-dihydroxy-5,5'-di-n-propyl-3,3,3',3'-tetramethyl-1,1'-spirobiindane;
5. 6,6'-dihydroxy-5,5'-diisopropyl-3,3,3',3'-tetramethyl-1,1'-spirobiindane;
6. 6,6'-dihydroxy-5,5'-di-n-butyl-3,3,3',3'-tetramethyl-1,1'-spirobiindane;
7. 6,6'-dihydroxy-5,5'-di-tert-butyl-3,3,3',3'-tetramethyl-1,1'-spirobiindane;
8. 6,6'-dihydroxy-5,5'-di-n-pentyl-3,3,3',3'-tetramethyl-1,1'-spirobiindane;
9. 6,6'-dihydroxy-5,5'-diisopentyl-3,3,3',3'-tetramethyl-1,1'-spirobiindane;
10. 6,6'-dihydroxy-5,5'-di-n-hexyl-3,3,3',3'-tetramethyl-1,1'-spirobiindane;
11. 6,6'-dihydroxy-5,5'-di-n-octyl-3,3,3',3'-tetramethyl-1,1'-spirobiindane;
12. 6,6'-dihydroxy-5,5'-di-(2-ethylhexyl)-3,3,3',3'-tetramethyl-1,1'-spirobiindane;
13. 6,6'-dihydroxy-5,5'-di-n-nonyl-3,3,3',3'-tetramethyl-1,1'-spirobiindane;
14. 6,6'-dihydroxy-5,5'-di-n-decyl-3,3,3',3'-tetramethyl-1,1'-spirobiindane;
15. 6,6'-dihydroxy-5,5'-di-n-dodecyl-3,3,3',3'-tetramethyl-1,1'-spirobiindane;
16. 6,6'-dihydroxy-5,5'-di-n-undecyl-3,3,3',3'-tetramethyl-1,1'-spirobiindane;
17. 6,6'-dihydroxy-5,5'-di-n-octadecyl-3,3,3',3'-tetramethyl-1,1'-spirobiindane;
18. 6,6'-dihydroxy-5,5'-dicyclopentyl-3,3,3',3'-tetramethyl-1,1'-spirobiindane;
19. 6,6'-dihydroxy-5,5'-dicyclohexyl-3,3,3',3'-tetramethyl-1,1'-spirobiindane;
20. 6,6'-dihydroxy-5,5'-dicycloheptyl-3,3,3',3'-tetramethyl-1,1'-spirobiindane;
21. 6,6'-dihydroxy-5,5'-dicyclooctyl-3,3,3',3'-tetramethyl-1,1'-spirobiindane;
22. 6,6'-dihydroxy-5,5'-di(4-methylcyclohexyl)-3,3,3',3'-tetramethyl-1,1'-spirobiindane;
23. 6,6'-dihydroxy-5,5'-di(4-tert-butylcyclohexyl)-3,3,3',3'-tetramethyl-1,1'-spirobiindane;
24. 6,6'-dihydroxy-5,5'-dicyclohexylmethyl-3,3,3',3'-tetramethyl-1,1'-spirobiindane;
25. 6,6'-dihydroxy-5,5'-dicyclohexylethyl-3,3,3',3'-tetramethyl-1,1'-spirobiindane;
26. 6,6'-dihydroxy-5,5'-di-tetrahydrofurfuryl-3,3,3',3'-tetramethyl-1,1'-spirobiindane;
27. 6,6'-dihydroxy-5,5'-di(2-methoxyethyl)-3,3,3',3'-tetramethyl-1,1'-spirobiindane;
28. 6,6'-dihydroxy-5,5'-di(2-ethoxyethyl)-3,3,3',3'-tetramethyl-1,1'-spirobiindane;
29. 6,6'-dihydroxy-5,5'-di(2-n-butoxyethyl)-3,3,3',3'-tetramethyl-1,1'-spirobiindane;
30. 6,6'-dihydroxy-5,5'-di(3-methoxypropyl)-3,3,3',3'-tetramethyl-1,1'-spirobiindane;
31. 6,6'-dihydroxy-5,5'-di(3-ethoxypropyl)-3,3,3',3'-tetramethyl-1,1'-spirobiindane;
32. 6,6'-dihydroxy-5,5'-di(3-n-butoxypropyl)-3,3,3',3'-tetramethyl-1,1'-spirobiindane;
33. 6,6'-dihydroxy-5,5'-di(3-n-hexyloxypropyl)-3,3,3',3'-tetramethyl-1,1'-spirobiindane;
34. 6,6'-dihydroxy-5,5'-di(2-methoxyethoxyethyl)-3,3,3',3'-tetramethyl-1,1'-spirobiindane;
35. 6,6'-dihydroxy-5,5'-di(2-ethoxyethoxyethyl)-3,3,3',3'-tetramethyl-1,1'-spirobiindane;
36. 6,6'-dihydroxy-5,5'-di(2-phenoxymethyl)-3,3,3',3'-tetramethyl-1,1'-spirobiindane;
37. 6,6'-dihydroxy-5,5'-di(2-phenoxyethoxyethyl)-3,3,3',3'-tetramethyl-1,1'-spirobiindane;

38. 6,6'-dihydroxy-5,5'-bischloromethyl-3,3,3',3'-tetramethyl-1,1'-spirobiindane;
39. 6,6'-dihydroxy-5,5'-di(2-chloroethyl)-3,3,3',3'-tetramethyl-1,1'-spirobiindane;
40. 6,6'-dihydroxy-5,5'-di(3-chloropropyl)-3,3,3',3'-tetramethyl-1,1'-spirobiindane;
41. 6,6'-dihydroxy-5,5'-di(2,2,2-trichloroethyl)-3,3,3',3'-tetramethyl-1,1'-spirobiindane;
42. 6,6'-dihydroxy-5,5'-dimethoxy-3,3,3',3'-tetramethyl-1,1'-spirobiindane;
43. 6,6'-dihydroxy-5,5'-diisopropoxy-3,3,3',3'-tetramethyl-1,1'-spirobiindane;
44. 6,6'-dihydroxy-5,5'-di-n-butoxy-3,3,3',3'-tetramethyl-1,1'-spirobiindane;
45. 6,6'-dihydroxy-5,5'-di-n-hexyloxy-3,3,3',3'-tetramethyl-1,1'-spirobiindane;
46. 6,6'-dihydroxy-5,5'-di-n-octyloxy-3,3,3',3'-tetramethyl-1,1'-spirobiindane;
47. 6,6'-dihydroxy-5,5'-di-n-octadecyloxy-3,3,3',3'-tetramethyl-1,1'-spirobiindane;
48. 6,6'-dihydroxy-5,5'-dicyclohexyloxy-3,3,3',3'-tetramethyl- 1,1'-spirobiindane;
49. 6,6'-dihydroxy-5,5'-di(4-tert-butylcyclohexyloxy)-3,3,3',3'-tetramethyl-1,1'-spirobiindane;
50. 6,6'-dihydroxy-5,5'-dicyclohexylmethyloxy-3,3,3',3'-tetramethyl-1,1'-spirobiindane;
51. 6,6'-dihydroxy-5,5'-dicyclohexylethyloxy-3,3,3',3'-tetramethyl-1,1'-spirobiindane;
52. 6,6'-dihydroxy-5,5'-di(2-methoxyethoxy)-3,3,3',3'-tetramethyl-1,1'-spirobiindane;
53. 6,6'-dihydroxy-5,5'-di(2-ethoxyethoxy)-3,3,3',3'-tetramethyl-1,1'-spirobiindane;
54. 6,6'-dihydroxy-5,5'-di(2-n-butoxyethoxy)-3,3,3',3'-tetramethyl-1,1'-spirobiindane;
55. 6,6'-dihydroxy-5,5'-di(3-methoxypropoxy)-3,3,3',3'-tetramethyl-1,1'-spirobiindane;
56. 6,6'-dihydroxy-5,5'-di(3-ethoxypropoxy)-3,3,3',3'-tetramethyl-1,1'-spirobiindane;
57. 6,6'-dihydroxy-5,5'-di(3-n-butoxypropoxy)-3,3,3',3'-tetramethyl-1,1'-spirobiindane;
58. 6,6'-dihydroxy-5,5'-di(3-n-hexyloxypropoxy)-3,3,3',3'-tetramethyl-1,1'-spirobiindane;
59. 6,6'-dihydroxy-5,5'-di(2-methoxyethoxyethoxy)-3,3,3',3'-tetramethyl-1,1'-spirobiindane;
60. 6,6'-dihydroxy-5,5'-di(2-ethoxyethoxyethoxy)-3,3,3',3'-tetramethyl-1,1'-spirobiindane;
61. 6,6'-dihydroxy-5,5'-di(2-phenoxymethoxy)-3,3,3',3'-tetramethyl-1,1'-spirobiindane;
62. 6,6'-dihydroxy-5,5'-di(2-phenoxyethoxy)-3,3,3',3'-tetramethyl-1,1'-spirobiindane;
63. 6,6'-dihydroxy-5,5'-di(2-phenoxyethoxyethoxy)-3,3,3',3'-tetramethyl-1,1'-spirobiindane;
64. 6,6'-dihydroxy-5,5'-di(2-chloroethoxy)-3,3,3',3'-tetramethyl-1,1'-spirobiindane;
65. 6,6'-dihydroxy-5,5'-di(2-chloropropoxy)-3,3,3',3'-tetramethyl-1,1'-spirobiindane;
66. 6,6'-dihydroxy-5,5'-di(2,2,2-trichloroethoxy)-3,3,3',3'-tetramethyl-1,1'-spirobiindane;
67. 6,6'-dihydroxy-5,5'-dinitro-3,3,3',3'-tetramethyl-1,1-spirobiindane;
68. 6,6'-dihydroxy-5,5'-difluoro-3,3,3',3'-tetramethyl-1,1-spirobiindane;
69. 6,6'-dihydroxy-5,5'-dichloro-3,3,3',3'-tetramethyl-1,1'-spirobiindane;
70. 6,6'-dihydroxy-5,5'-dibromo-3,3,3',3'-tetramethyl-1,1'-spirobiindane;
71. 6,6'-dihydroxy-5,5'-diiodo-3,3,3',3'-tetramethyl-1,1'-spirobiindane;
72. 6,6'-dihydroxy-3,3,3',3',4,4'-hexamethyl-1,1'-spirobiindane;
73. 6,6'-dihydroxy-4,4'-dimethoxy-3,3,3',3'-tetramethyl-1,1'-spirobiindane;
74. 6,6'-dihydroxy-4,4'-dinitro-3,3,3',3'-tetramethyl-1,1'-spirobiindane;
75. 6,6'-dihydroxy-4,4'-dichloro-3,3,3',3'-tetramethyl-1,1'-spirobiindane;
76. 6,6'-dihydroxy-3,3,3',3',7,7'-hexamethyl-1,1'-spirobiindane;
77. 6,6'-dihydroxy-7,7'-dimethoxy-3,3,3',3'-tetramethyl-1,1'-spirobiindane;
78. 6,6'-dihydroxy-7,7'-dinitro-3,3,3',3'-tetramethyl-1,1'-spirobiindane;
79. 6,6'-dihydroxy-7,7'-dichlro-3,3,3',3'-tetramethyl-1,1'-spirobiindane;
80. 6,6'-dihydroxy-3,3,3',3',5,5',7,7'-octamethyl-1,1'-spirobiindane;
81. 6,6'-dihydroxy-5,5',7,7'-tetrachlro-3,3,3',3'-tetramethyl-1,1'-spirobiindane;
82. 6,6'-dihydroxy-7,7'-dichlro-3,3,3',3',5,5'-hexamethyl-1,1'-spirobiindane;
83. 6,6'-dihydroxy-4,4',5,5',7,7'-hexachlro-3,3,3',3'-tetramethyl-1,1'-spirobiindane;
84. 4,4'-dihydroxy-3,3,3',3'-tetramethyl-1,1'-spirobiindane;
85. 5,5'-dihydroxy-3,3,3',3'-tetramethyl-1,1'-spirobiindane;
86. 7,7'-dihydroxy-3,3,3',3'-tetramethyl-1,1'-spirobiindane.

A dihydroxy compound represented by general formula (2) as a material may be selected, but of course not limited to, from the dihydroxy compounds shown in Table 1-1 to 1-5.

TABLE 1-1

| NO. | structural formula |
|---|---|
| 1 | HO—CH₂—CH₂—O—[6,6'-spirobiindane-1,1,3,3,1',1',3',3'-octamethyl]—O—CH₂—CH₂—OH |
| 2 | HO—(CH₂—CH₂—O)₂—[spirobiindane core]—(O—CH₂—CH₂)₂—OH |
| 3 | HO—(CH₂—CH₂—O)₃—[spirobiindane core]—(O—CH₂—CH₂)₃—OH |
| 4 | HO—(CH₂—CH₂—O)₄—[spirobiindane core]—(O—CH₂—CH₂)₄—OH |
| 5 | HO—(CH₂—CH₂—O)₅—[spirobiindane core]—(O—CH₂—CH₂)₅—OH |

TABLE 1-2

| NO. | structural formula |
|---|---|
| 6 | HO—(CH₂—CH₂—O)₈—[spirobiindane core]—(O—CH₂—CH₂)₈—OH |

TABLE 1-2-continued
| NO. | structural formula |
|---|---|
| 7 | 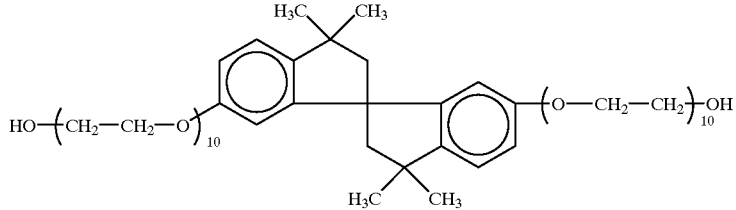 |
| 8 | 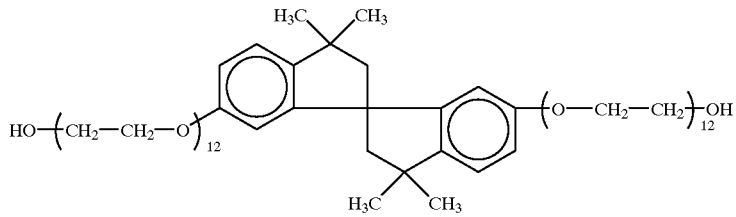 |
| 9 | 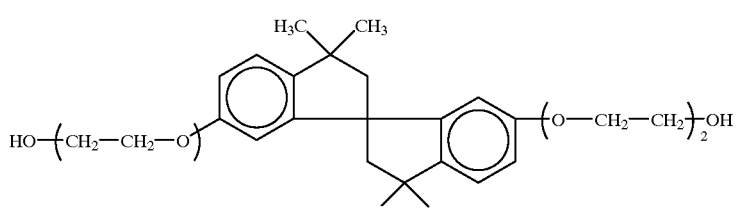 |
| 10 | 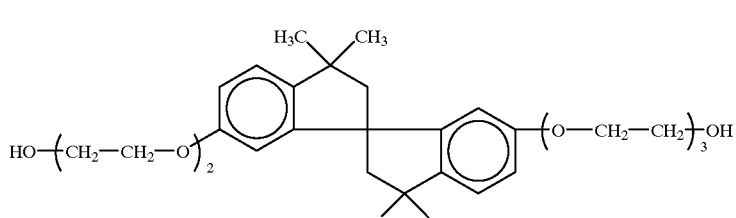 |
TABLE 1-3
| NO. | structural formula |
|---|---|
| 11 | 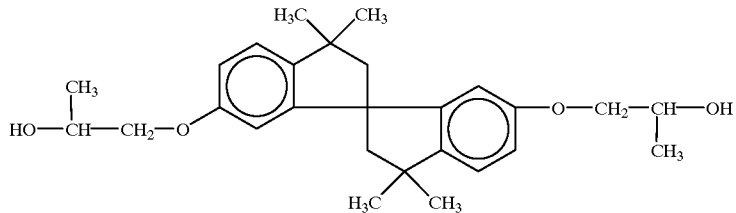 |

TABLE 1-3-continued
| NO. | structural formula |
|---|---|
| 12 | 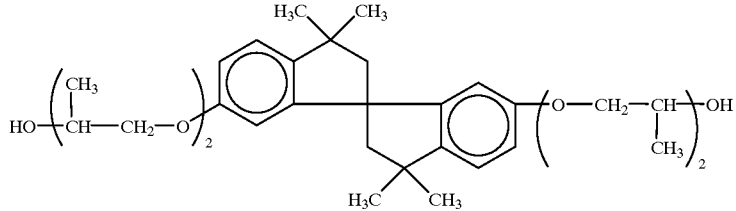 |
| 13 | 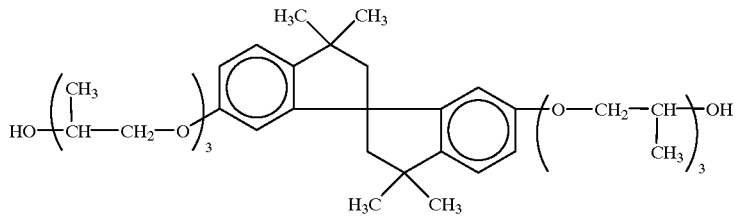 |
| 14 | 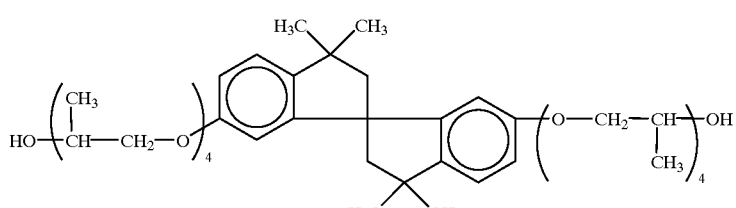 |
| 15 | 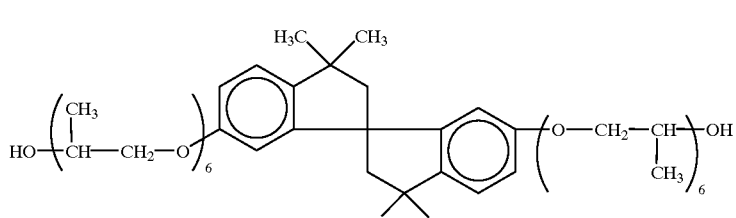 |
TABLE 1-4
| NO. | structural formula |
|---|---|
| 16 | 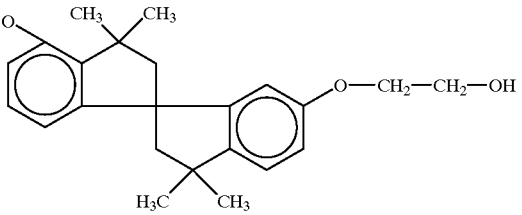 |
| 17 | 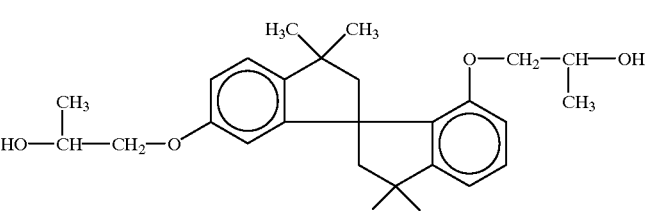 |

TABLE 1-4-continued

| NO. | structural formula |
|---|---|
| 18 | *spirobiindane with HO-CH₂-CH₂-O- substituent on one ring and -O-CH₂-CH₂-OH on the other; four CH₃ groups on the indane sp3 carbons* |
| 19 | *spirobiindane isomer with HO-CH₂-CH₂-O- and -O-CH₂-CH₂-OH at different ring positions; four CH₃ groups* |
| 20 | *spirobiindane isomer with HO-CH₂-CH₂-O- and -O-CH₂-CH₂-OH substituents; four CH₃ groups* |

TABLE 1-5

| NO. | structural formula |
|---|---|
| 21 | *spirobiindane with HO-CH₂-CH₂-O- and -O-CH₂-CH₂-OH substituents; aromatic rings bear additional CH₃ groups (tetramethyl substitution pattern); four CH₃ groups on sp3 carbons* |
| 22 | *spirobiindane with HO-CH₂-CH₂-O- and -O-CH₂-CH₂-OH substituents; aromatic rings bear Cl substituents (tetrachloro); four CH₃ groups on sp3 carbons* |

TABLE 1-5-continued

| NO. | structural formula |
|---|---|
| 23 | (structure) |
| 24 | (structure) |
| 25 | (structure) |

A dihydroxy compound represented by general formula (3) may be selected from, but of course not limited to, the following exemplary compounds;

1. α,α'-bis(4-hydroxyphenyl)-1,3-diisopropylbenzene;
2. α,α'-bis(4-hydroxy-2-methylphenyl)-1,3-diisopropylbenzene;
3. α,α'-bis(4-hydroxy-2-ethylphenyl)-1,3-diisopropylbenzene;
4. α,α'-bis(4-hydroxy-2-n-propylphenyl)-1,3-diisopropylbenzene;
5. α,α'-bis(4-hydroxy-2-isopropylphenyl)-1,3-diisopropylbenzene;
6. α,α'-bis(4-hydroxy-2-n-butylphenyl)-1,3-diisopropylbenzene;
7. α,α'-bis(4-hydroxy-2-isobutylphenyl)-1,3-diisopropylbenzene;
8. α,α'-bis(4-hydroxy-2-tert-butylphenyl)-1,3-diisopropylbenzene;
9. α,α'-bis(4-hydroxy-2-n-pentylphenyl)-1,3-diisopropylbenzene;
10. α,α'-bis(4-hydroxy-2-isopentylphenyl)-1,3-diisopropylbenzene;
11. α,α'-bis(4-hydroxy-2-n-hexylphenyl)-1,3-diisopropylbenzene;
12. α,α'-bis(4-hydroxy-2-n-octylphenyl)-1,3-diisopropylbenzene;
13. α,α'-bis(4-hydroxy-2-n-methoxyphenyl)-1,3-diisopropylbenzene;
14. α,α'-bis(4-hydroxy-2-n-ethoxyphenyl)-1,3-diisopropylbenzene;
15. α,α'-bis(4-hydroxy-2-n-propoxyphenyl)-1,3-diisopropylbenzene;
16. α,α'-bis(4-hydroxy-2-isopropoxyphenyl)-1,3-diisopropylbenzene;
17. α,α'-bis(4-hydroxy-2-n-butoxyphenyl)-1,3-diisopropylbenzene;
18. α,α'-bis(4-hydroxy-3-nitrophenyl)-1,3-diisopropylbenzene;
19. α,α'-bis(4-hydroxy-3-fluorophenyl)-1,3-diisopropylbenzene;
20. α,α'-bis(4-hydroxy-3-bromophenyl)-1,3-diisopropylbenzene;
21. α,α'-bis(4-hydroxy-3-chlorophenyl)-1,3-diisopropylbenzene;
22. α,α'-bis(4-hydroxy-3-iodophenyl)-1,3-diisopropylbenzene;
23. α,α'-bis(4-hydroxy-3-chloro-2-methylphenyl)-1,3-diisopropylbenzene;
24. α,α'-bis(4-hydroxyphenyl)-1,3-diethylbenzene;
25. α,α'-bis(4-hydroxyphenyl)-1,4-diisopropylbenzene;
26. α,α'-bis(4-hydroxy-2-methylphenyl)-1,4-diisopropylbenzene;
27. α,α'-bis(4-hydroxy-2-methoxyphenyl)-1,4-diisopropylbenzene;
28. α,α'-bis(4-hydroxy-2-ethoxyphenyl)-1,4-diisopropylbenzene;
29. α,α'-bis(4-hydroxy-3-nitrophenyl)-1,4-diisopropylbenzene;
30. α,α'-bis(4-hydroxy-3-fluorophenyl)-1,4-diisopropylbenzene;
31. α,α'-bis(4-hydroxy-3-chlorophenyl)-1,4-disopropylbenzene; and
32. α,α'-bis(4-hydroxyphenyl)-1,3-diethylbenzene.

Dihydroxy compounds represented by general formulas (1) (2) and (3) are known and can be prepared by known processes. Each preparation process therefor will be described.

A dihydroxy compound represented by general formula (1) may be prepared by a process described in, e.g., JP-A 62-10030. It is obtained by heating of bisphenol A in the presence of an acidic catalyst.

A dihydroxy compound represented by general formula (2) may be prepared by a known reaction, using a dihydroxy compound represented by general formula (1) as a starting material. Specifically, the dihydroxy compound represented by general formula (2) may be prepared by reacting the dihydroxy compound represented by general formula (1) with an alkylene oxide such as ethylene oxide and propylene oxide; a cyclic carbonate such as ethylene carbonate and propylene carbonate; or a β-halohydrin such as 2-bromoethanol, 2-chloroethanol and 2-bromo-1-propanol.

A dihydroxy compound represented by general formula (3) may be prepared by a known process such as one described in JP-B HEI8-13770, i.e., by reacting a compound such as α,α'-dihydroxydiisopropylbenzenes and diisopropenylbenzenes with a phenolic compound in the presence of an acidic catalyst such as ion-exchange resins.

The polycarbonate copolymer of this invention may be prepared by any of various known polymerization processes for a polycarbonate; for example, the processes described in Jikken Kagaku Koza, 4th ed. (28), Polymer Synthesis, pp.231–242, Maruzen(1988), specifically a solution polymerization process, a transesterification and an interfacial polymerization.

Typically, the copolymer of this invention may be prepared by reacting a dihydroxy compound represented by general formula (1) and at least one of dihydroxy compounds by general formulas (2) and (3) as starting materials, with a carbonate precursor such as carbonic diesters including dimethyl carbonate, diethyl carbonate and diphenyl carbonate, and halogenated carbonyl compounds including phosgene.

In a solution polymerization process, the above dihydroxy compounds are reacted with a halogenated carbonyl compound such as phosgene in the presence of an organic base such as pyridine in an organic solvent.

In an interfacial polymerization, a mixture with an interface consisting of an aqueous solution of the above dihydroxy compounds and an alkali or alkaline earth metal base and an organic solvent is subject to condensation polymerization with a halogenated carbonyl compound, in the presence of a catalyst such as triethylamine and/or a molecular weight modifier, if desirable. Organic solvents which may be used include halogenated aliphatic hydrocarbons such as dichloromethane, chloroform, 1,2-dichloroethane, 1,2-dichloroethylene, trichloroethane, tetrachloroethane and dichloropropane; halogenated aromatic hydrocarbons such as chlorobenzene and dichlorobenzene; or mixtures thereof.

In a transesterification, a solution of the above dihydroxy compounds and a carbonic diester compound such as dimethyl carbonate, diethyl carbonate and diphenyl carbonate or a molten mixture thereof is heated in the presence of a catalyst, if desirable.

The polycarbonate copolymer of this invention consists essentially of the repeating structural unit represented by general formula (1-a) and at least one of the repeating structural units represented by general formulas (2-a) and (3-a), including a two-component copolymer consisting of two repeating structural units and a multi-component copolymer consisting of more than two repeating structural units.

Preferable examples of the polycarbonate copolymer are as follows;
(a) a polycarbonate copolymer comprising the repeating structural units represented by general formulas (1-a) and (2-a);
(b) a polycarbonate copolymer comprising the repeating structural units represented by general formulas (1-a) and (3-a); and
(c) a polycarbonate copolymer comprising the repeating structural units represented by general formulas (1-a), (2-a) and (3-a).

In the light of balance between physical properties such as heat resistance and mechanical properties, among others, the following polycarbonate copolymers are more preferable. A preferable polycarbonate copolymer described in (a) contains the repeating structural unit represented by (2-a) in a proportion of 5 to 90 mol %, more preferably 10 to 80 mol % and most preferably 20 to 70 mol % in the total repeating structural units represented by general formulas (1-a) and (2-a). A preferable polycarbonate copolymer described in (b) contains the repeating structural unit represented by (1-a) in a proportion of 5 to 90 mol %, more preferably 10 to 80 mol % and most preferably 20 to 70 mol % in the total repeating structural units represented by general formulas (1-a) and (3-a). A preferable polycarbonate copolymer described in (c) contains the repeating structural units represented by (1-a) and (2-a) in a proportion of 5 to 90 mol %, more preferably 10 to 80 mol % and most preferably 20 to 70 mol % in the total repeating structural units represented by general formulas (1-a), (2-a) and (3-a).

In these polycarbonate copolymers, the repeating structural units represented by general formulas (1-a), (2-a) and (3-a) may be a plurality of repeating structural units different from each other.

The polycarbonate copolymer of this invention may comprise, besides the repeating structural units represented by general formulas (1-a) and (2-a) and/or (3-a), other repeating structural units. In such a copolymer, a proportion of the repeating structural units represented by general formulas (1-a) and (2-a) and/or (3-a) may be, but not limited to, at least 50 mol %, preferably at least 70 mol % and more preferably at least 90 mol % in total repeating structural units, for achieving desirable effects by this invention. To make this invention most effective, a copolymer just consisting of the general repeating structural units represented by general formulas (1-a) and (2-a) and/or (3-a) is particularly preferable. In these copolymers, a terminal repeating structural unit may be one derived from a molecular weight modifier.

The polycarbonate copolymer of this invention may be any of random, alternating and block copolymers, as long as it can achieve desirable effects by this invention. The polycarbonate copolymer described in (a) may be preferably a random or block copolymer. The polycarbonate copolymer described in (b) may be preferably a random copolymer. The polycarbonate copolymer described in (c) may be preferably a random or block copolymer.

To prepare the polycarbonate copolymer of this invention as a random copolymer, dihydroxy compounds represented by general formulas (1) and (2) and/or (3) are blended and the mixture is reacted with a carbonate precursor.

To prepare the polycarbonate copolymer as an alternating copolymer, for the polycarbonate copolymer described in (a) or (b), one of a dihydroxy compound represented by general formula (1) and a dihydroxy compound represented by general formula (2) or (3) is reacted with a carbonate precursor to provide a monomer intermediate terminated with a haloformate or carbonate group, which is then reacted with the other dihydroxy compound. For the polycarbonate copolymer described in (c), a dihydroxy compound represented by general formula (1) is reacted with a dihydroxy compound represented by general formula (2) whose one end is a haloformate group to provide an asymmetric carbonate derivative from the dihydroxy compounds represented by general formulas (1) and (2). The carbonate derivative is reacted with a dihydroxy compound represented by formula (3) whose one end is a haloformate group, to provide a derivative terminated with hydroxy group having the structure that the dihydroxy compounds represented by general formulas (1), (2) and (3) are sequentially coupled via two carbonate groups, which is then reacted with a carbonate precursor for polymerization.

To prepare the polycarbonate copolymer as a block copolymer, for the polycarbonate copolymer described in (a) or (b), one of a dihydroxy compound represented by general formula (1) and a dihydroxy compound represented by general formula (2) or (3) is reacted with a carbonate precursor to prepare a polycarbonate oligomer whose majority of ends are a haloformate or carbonate group, which is then reacted with the other dihydroxy compound or a polycarbonate oligomer derived from the dihydroxy compound. For the polycarbonate copolymer described in (c), one of a dihydroxy compounds represented by general formulas (1), (2) and (3) is reacted with a carbonate precursor to prepare a polycarbonate oligomer whose majority of ends are a haloformate or carbonate group, which is then reacted with the other two dihydroxy compounds or polycarbonate oligomers derived from the dihydroxy compounds.

As described above, the polycarbonate copolymer of this invention may comprise, besides the repeating structural units represented by general formulas (1-a) and (2-a) and/or (3-a), other repeating structural units. Repeating structural units other than those represented by general formulas (1-a), (2-a) or (3-a) may be those derived from dihydroxy compounds other than those represented by general formula (1), (2) or (3), including a variety of known aromatic and aliphatic dihydroxy compounds.

Examples of the aromatic dihydroxy compounds are bis(hydroxyaryl)alkanes such as bis (4-hydroxyphenyl)methane, 1,1-bis(4'-hydroxyphenyl)ethane, 1,2-bis(4'-hydroxyphenyl)ethane, bis(4-hydroxyphenyl) phenylmethane, bis(4-hydroxyphenyl)diphenylmethane, bis(4-hydroxyphenyl)-1-naphthylmethane, 1,1-bis(4'-hydroxyphenyl)-1-phenylethane, 2-(4'-hydroxyphenyl)-2-(3'-hydroxyphenyl)propane, 2,2-bis(4'-hydroxyphenyl)butane, 1,1-bis(4'-hydroxyphenyl)butane, 2,2-bis(4'-hydroxyphenyl)-3-methylbutane, 2,2-bis(4'-hydroxyphenyl)pentane, 3,3-bis(4'-hydroxyphenyl)pentane, 2,2-bis(4'-hydroxyphenyl)hexane, 2,2-bis(4'-hydroxyphenyl)octane, 2,2-bis(4'-hydroxyphenyl)-4-methylpentane, 2,2-bis(4'-hydroxyphenyl)heptane, 4,4-bis(4'-hydroxyphenyl)heptane, 2,2-bis(4'-hydroxyphenyl)tridecane, 2,2-bis(4'-hydroxyphenyl)octane, 2,2-bis(3'-methyl-4'-hydroxyphenyl)propane, 2,2-bis(3'-ethyl-4'-hydroxyphenyl)propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl)propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl)propane, 2,2-bis(3'-methoxy-4'-hydroxyphenyl)propane, 2,2-bis(3',5'-dimethyl-4'-hydroxyphenyl)propane, 2,2-bis(2',3',5',6'-tetramethyl-4'-hydroxyphenyl)propane, bis(4-hydroxyphenyl)cyanomethane, 1-cyano-3,3-bis(4'-hydroxyphenyl)butane and 2,2-bis(4'-hydroxyphenyl)hexafluoropropane;

bis(hydroxyaryl)cycloalkanes such as 1,1-bis(4'-hydroxyphenyl)cyclopentane, 1,1-bis(4'-hydroxyphenyl)cyclohexane, 1,1-bis(4'-hydroxyphenyl)cycloheptane, 1,1-bis(3'-methyl-4'-hydroxyphenyl)cyclohexane, 1,1-bis(3',5'-dimethyl-4'-hydroxyphenyl)cyclohexane, 1,1-bis(3',5'-dichloro-4'-hydroxyphenyl)cyclohexane, 1,1-bis(3'-methyl-4'-hydroxyphenyl)-4-methylcyclohexane, 1,1-bis(4'-hydroxyphenyl)-3,3,5-trimethylcyclohexane, 2,2-bis(4'-hydroxyphenyl)norbornane and 2,2-bis(4'-hydroxyphenyl)adamantane;

bis (hydroxyaryl) ethers such as 4,4'-dihydroxydiphenyl ether, 4,4'-dihydroxy-3,3'-dimethyldiphenyl ether and ethylene glycol bis(4-hydroxyphenyl) ether;

bis(hydroxyaryl) sulfides such as 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide and 3,3'-diphenyl-4,4'-dihydroxydiphenyl sulfide;

bis(hydroxyaryl) sulfoxides such as 4,4'-dihydroxydiphenyl sulfoxide and 3,3'-dimethyl-4,4'-dihydroxydiphenyl sulfoxide;

bis(hydroxyaryl) sulfones such as 4,4'-dihydroxydiphenyl sulfone and 4,4'-dihydroxy-3,3'-dimethyldiphenyl sulfone;

bis(hydroxyaryl) ketones such as bis(4-hydroxyphenyl) ketone and bis(4-hydroxy-3-methylphenyl)ketone;

7,7'-dihydroxy-3,3',4',4'-tetrahydro-4,4,4',4'-tetramethyl-2,2'-spirobi(2H-1-benzopyrane); trans-2,3-bis(4'-hydroxyphenyl)-2-butene; 9,9-bis(4'-hydroxyphenyl)fluorene; 3,3-bis(4'-hydroxyphenyl)-2-butanone; 1,6-bis(4'-hydroxyphenyl)-1,6-hexanedione; 4,4'-dihydroxybiphenyl; hydroquinone; and resorcinol.

Furthermore, an aromatic dihydroxy compound containing an ester bond which may be prepared, for example, by reacting 2 moles of bisphenol A with 1 mole of isophthaloyl chloride or telephthaloyl chloride, may be also useful.

Examples of the aliphatic dihydroxy compounds are dihydroxyalkanes such as 1,2-dihydroxyethane, 1,3-dihydroxypropane, 1,4-dihydroxybutane, 1,5-dihydroxypentane, 3-methyl-1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, dihydroxyneopentane, 2-ethyl-1,2-dihydroxyhexane and 2-methyl-1,3-dihydroxypropane;

dihydroxycycloalkanes such as 1,3-dihydroxycyclohexane, 1,4-dihydroxycyclohexane and 2,2-bis(4'-hydroxylcyclohexyl)propane;

dihydroxy compounds such as o-dihydroxyxylylene; m-dihydroxyxylylene; p-dihydroxyxylylene; 1,4-bis(2'-hydroxyethyl)benzene; 1,4-bis(3'-hydroxypropyl)benzene; 1,4-bis(4'-hydroxybutyl)benzene; 1,4-bis(5'-hydroxypentyl)benzene; 1,4-bis(6'-hydroxyhexyl)benzene; and 2,2-bis[4'-(2"-hydroxyethyloxy)phenyl]propane.

The copolymer of this invention may contain a repeating structural unit derived from a bifunctional compound other than the above dihydroxy compounds, besides repeating structural units represented by general formulas (1-a) and (2-a) and/or (3-a). Specific examples of such a bifunctional compound other than the above dihydroxy compounds are aromatic dicarboxylic acids, aliphatic dicarboxylic acids, aromatic diamines, aliphatic diamines, aromatic diisocyanates and aliphatic diisocyanates. These bifunctional compounds may be used to provide a polycarbonate copolymer containing a group or groups such as imino, ester, ether, imide, amide, urethane and urea groups, which is covered by this invention.

The polycarbonate copolymer of this invention may have a reactive end group such as hydroxy, haloformate and carbonate, or an inert end group inactivated by a molecular weight modifier.

The rate of the end groups in the polycarbonate copolymer of this invention may be usually, but not limited to, 0.001 to 10 mol %, preferably 0.01 to 5 mol % and more preferably 0.1 to 3 mol %, to the total mole number of the structural units.

When the polycarbonate copolymer of this invention is prepared according to the above process, it may be sometimes preferable to conduct polymerization in the presence of a molecular weight modifier for controlling the molecular weight of the product. Such a molecular weight modifier may be, but not limited to, selected from a variety of known molecular weight modifiers in a known polycarbonate polymerization process, including univalent aliphatic and aromatic hydroxy compounds and their derivatives(e.g., alkali or alkaline earth metal salts of univalent aliphatic or aromatic hydroxy compounds; haloformates of univalent aliphatic or aromatic hydroxy compounds; and carbonates of univalent aliphatic or aromatic hydroxy compounds) and univalent carboxylic acids and their derivatives (e.g., alkali or alkaline earth metal salts of univalent carboxylic acids; acid halides of univalent carboxylic acids; and esters of univalent carboxylic acids).

Examples of the above univalent aliphatic or aromatic hydroxy compounds are methanol, ethanol, butanol, octanol, lauryl alcohol, methoxyethanol, propylene glycol monomethyl ether, cyclohexanol, benzyl alcohol, allyl alcohol, phenol, 4-tert-butylphenol, 2-cresol, 3-cresol, 4-cresol, 2-ethylphenol, 4-ethylphenol, 4-cumylphenol, 4-phenylphenol, 4-cyclohexylphenol, 4-n-octylphenol, 4-isooctylphenol, 4-nonylphenol, 4-methoxyphenol, 4-n-hexyloxyphenol, 4-isopropenylphenol, 2-chlorophenol, 3-chlorophenol, 4-chlorophenol, 2-bromophenol, 3-bromophenol, 4-bromophenol, 2,4-dichlorophenol, 2,4-dibromophenol, pentachlorophenol, pentabromophenol, β-naphthol, α-naphthol and 2-(4'-methoxyphenyl)-2-(4"-hydroxyphenyl)propane.

Examples of the above univalent carboxylic acid are aliphatic carboxylic acids such as acetic acid, propionic acid, butyric acid, valeric acid, caproic acid, heptanoic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 2,4-dimethylvaleric acid, 3,5-dimethylcaproic acid and phenoxyacetic acid; and benzoic acids such as benzoic acid, 4-propoxybenzoic acid, 4-butoxybenzoic acid, 4-pentyloxybenzoic acid, 4-hexyloxybenzoic acid and 4-octyloxybenzoic acid.

The molecular weight modifier maybe used in a desirable amount with no limitations, for controlling the molecular weight to a given value; usually 0.001 to 10 mol % and preferably 0.01 to 5 mol %, to the total mole number of the polymerized dihydroxy compounds.

The molecular weight of the polycarbonate copolymer of this invention may be, but not limited to, usually 5,000 to 200,000, preferably 10,000 to 150,000 and more preferably 15,000 to 120,000 as a weight average molecular weight reduced to a standard polystyrene determined by GPC (gel permeation chromatography).

The polydispersity index given as the ratio of its weight average molecular weight to its number average molecular weight is, but not limited to, preferably 1.5 to 20.0, more preferably 2.0 to 15.0 and most preferably 2.0 to 10.0.

The polycarbonate copolymer of this invention may be blended with an aromatic polycarbonate derived from 2,2-bis(4'-hydroxyphenyl)propane or may be further combined with other polymers, to be used as a molding material. Examples of other polymers are polyethylene, polypropylene, polystyrene, ABS resin, polymethyl methacrylate, polytrifluoroethylene, polytetrafluoroethylene, polyacetal, polyphenylene oxide, polybutylene telephthalate, polyethylene terephthalate, polyamides, polyimides, polyamide imides, polyether imides, polysulfones, polyether sulfones, paraoxybenzoyl polyesters, polyarylates and polysulfides.

The polycarbonate copolymer of this invention may be prepared by polymerization, during or after which known additives such as pigments, dyes, thermal stabilizers, antioxidants, ultraviolet absorbers, mold releases, organohalides, alkali metal sulfonates, glass fiber, carbon fiber, glass beads, barium sulfate and $TiO_2$ may be added in a well-known manner.

The polycarbonate copolymer of this invention containing, if necessary, one or more of the above additives may be used alone or in combination with other polymers as a molding material to be molded into a variety of products such as a chassis and a housing part for, e.g., an electrical equipment, an electronic component, an automobile part, a substrate for an information recording medium including an optical disk, an optical material including a lens for a camera or eyeglasses and a construction material alternative to glass.

The polycarbonate copolymer of this invention is thermoplastic and thus the molten copolymer may be subject to, for example, injection molding, extrusion molding, blow molding and impregnation into a filler, as well as may be readily molded by a variety of known molding processes such as compression molding and solution casting.

Optical components from the polycarbonate copolymer of this invention include a substrate for an optical recording medium such as an optical disk and a magneto-optical disk, an optical lens such as a pick-up lens, a plastic substrate for a liquid crystal cell and a prism. These optical components may be suitably manufactured by any of the above well-known molding processes, typically by injection molding.

The optical components of this invention thus obtained have a lower birefringence and good properties such as optical recording properties as an optical disk and durability, and therefore, are very useful.

This invention will be specifically described with reference to, but not limited to, the following examples. The following method was used for determination of the physical properties of the polycarbonates prepared in these Examples and Comparative Examples.

Molecular Weight

A 0.2 wt % solution of an aromatic polycarbonate in chloroform was measured with a GPC (gel permeation chromatography) apparatus (Showa Denko K.K., System-11) to determine its weight average molecular weight (Mw). The measured values are indicated after reducing to a standard polystyrene.

Melt Viscosity

A melt viscosity was determined with Shimazu Koka Flow Tester (CFT 500A), using an orifice with a diameter of 0.1 cm and a length of 1 cm under a load of 100 kg.

EXAMPLE 1

In a 2 L flask equipped with an agitator, a reflux condenser and a dipping phosgene-inlet tube were placed 77.10 g of the dihydroxy compound represented by formula (1-1) (0.25 mol), 99.10 g of the dihydroxy compound represented by formula (2-1)(0.25 mol), 0.94 g of phenol as a terminator (0.010 mol; 2 mol % to the diol components), 197.75 g of pyridine (2.50 mol) and 700 g of dichloromethane. Into the mixture under ice cooling, 64.35 g of phosgene (0.65 mol) was introduced over 3 hours, and the reaction mixture was stirred for additional 2 hours. After completion of the reaction, the mixture was washed with 5 % hydrochloric acid to remove excessive pyridine as a hydrochloride, and was repeatedly washed with water until the aqueous washing became neutral. The organic layer was separated and dichloromethane was evaporated under a reduced pressure. The resulting solid was crushed and dried at 100° C. for one hour to give a polycarbonate copolymer (random copolymer) comprising the repeating structural units represented by formulas (1-a-1) and (2-a-1) as a white powdery solid, whose weight average molecular weight was 71,000.

The copolymer was subject to differential thermal analysis in the range of 0° C. to 300° C. using a scanning calorimeter (DSC-3100, Mac Science) to show a glass-transition temperature (Tg) of 145° C. Its melt viscosity at 220° C. was 4,500 poise.

The $^1$H NMR results for a 1 wt % solution of the polycarbonate copolymer in CDCl$_3$ were as follows;

$^1$H NMR δ (CDCl$_3$): 1.3(s, 12H), 1.4(s, 12H), 2.3(m, 8H), 3.9–4.5(m, 8H), 6.3–7.2(m, 12H).

IR(KBr): 1750 cm$^{-1}$, 1780 cm$^{-1}$[—O—C(=O)—O—].

An integration ratio of the protons in the ethylene chains to those on the aromatic rings was determined from the above $^1$H NMR results. Thus, it was found that a molar ratio of the repeating structural unit represented by formula (1-a-1) to that represented by formula (2-a-1) in the polycarbonate copolymer was 50/50.

EXAMPLE 2

A polycarbonate copolymer (random copolymer) comprising the repeating structural units represented by formulas (1-a-1) and (2-a-1) was prepared as described in Example 1, except that the amounts of the dihydroxy compounds represented by formulas (1-1) and (2-1) were 46.26 g (0.15 mol) and 138.74 g (0.35 mol), respectively, instead of 77.10 g (0.25 mol) and 99.10 g (0.25 mol) and that the amount of phenol as a terminator was 0.47 g (0.005 mol; 1 mol % to the diol components). Its weight average molecular weight

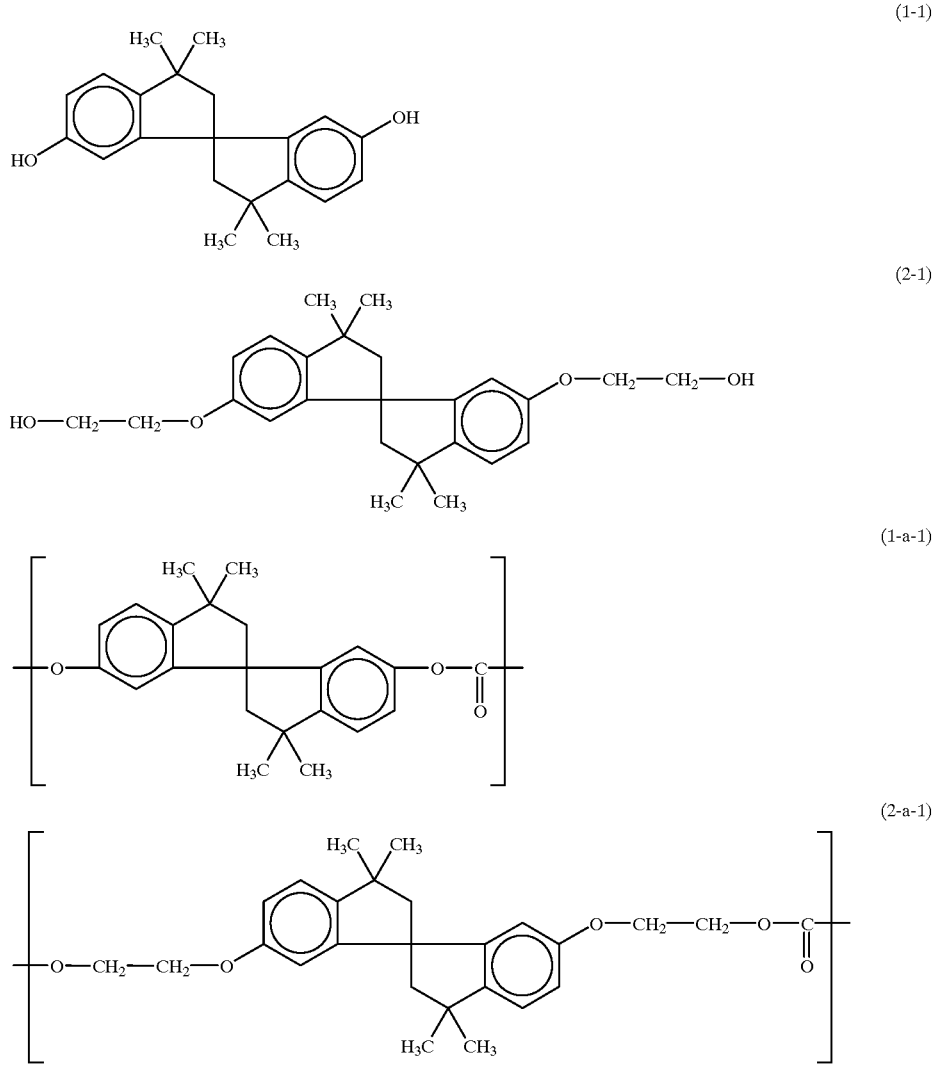

and glass-transition temperature (Tg) were 95,000 and 135° C., respectively. Its melt viscosity at 220° C. was 4,500 poise.

As described in Example 1, the polycarbonate copolymer was subject to $^1$H-NMR analysis, which indicates that a molar ratio of the repeating structural unit represented by formula (1-a-1) to that represented by formula (2-a-1) in the polycarbonate copolymer was 30/70.

EXAMPLE 3

A polycarbonate copolymer (random copolymer) comprising the repeating structural units represented by formulas (1-a-1) and (2-a-1) was prepared as described in Example 1, except that the amounts of the dihydroxy compounds represented by formulas (1-1) and (2-1) were 46.26 g (0.15 mol) and 138.74 g (0.35 mol), respectively, instead of 77.10 g (0.25 mol) and 99.10 g (0.25 mol) and that the amount of phenol as a terminator was 0.71 g (0.0075 mol; 1.5 mol % to the diol components). Its weight average molecular weight and glass-transition temperature (Tg) were 70,000 and 135° C., respectively. Its melt viscosity at 220° C. was 1,500 poise.

As described in Example 1, the polycarbonate copolymer was subject to $^1$H-NMR analysis, which indicated that a molar ratio of the repeating structural unit represented by formula (1-a-1) to that represented by formula (2-a-1) in the polycarbonate copolymer was 30/70.

EXAMPLE 4

A polycarbonate copolymer (random copolymer) comprising the repeating structural units represented by formulas (1-a-1) and (2-a-1) was prepared as described in Example 1, except that the amounts of the dihydroxy compounds represented by formulas (1-1) and (2-1) were 123.36 g (0.40 mol) and 39.64 g (0.10 mol), respectively, instead of 77.10 g (0.25 mol) and 99.10 g (0.25 mol). Its weight average molecular weight and glass-transition temperature (Tg) were 65,000 and 165° C., respectively. Its melt viscosity at 220° C. was 6,500 poise.

As described in Example 1, the polycarbonate copolymer was subject to $^1$H-NMR analysis, which indicated that a molar ratio of the repeating structural unit represented by formula (1-a-1) to that represented by formula (2-a-1) in the polycarbonate copolymer was 80/20.

EXAMPLE 5

A polycarbonate copolymer comprising the repeating structural units represented by formulas (1-a-2) and (2-a-2) was prepared as described in Example 2, except that the dihydroxy compounds represented by formulas (1-1) and (2-1) were replaced by the dihydroxy compounds represented by formulas (1-2) and (2-2), respectively. Its weight average molecular weight and glass-transition temperature (Tg) were 72,000 and 140° C., respectively. Its melt viscosity at 220° C. was 5,500 poise.

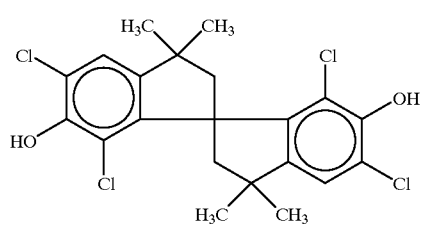

(1-2)

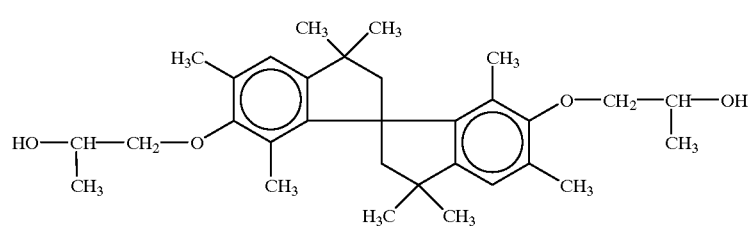

(2-2)

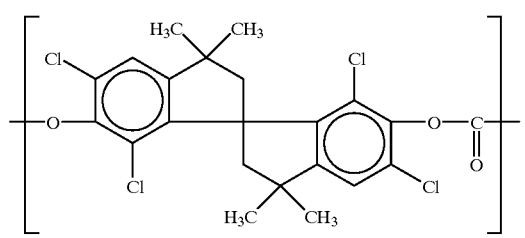

(1-a-2)

(2-a-2)

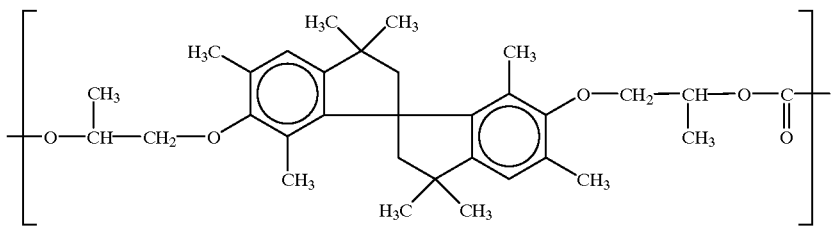

As described in Example 1, the polycarbonate copolymer was subject to ¹H-NMR analysis, which indicated that a molar ratio of the repeating structural unit represented by formula (1-a-2) to that represented by formula (2-a-2) in the polycarbonate copolymer was 50/50.

sented by formulas (1-3) and (2-3), respectively. Its weight average molecular weight and glass-transition temperature (Tg) were 80,000 and 145° C., respectively. Its melt viscosity at 220° C. was 6,000 poise.

(1-3)

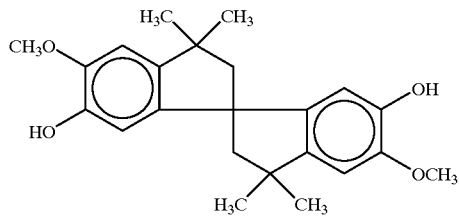

(2-3)

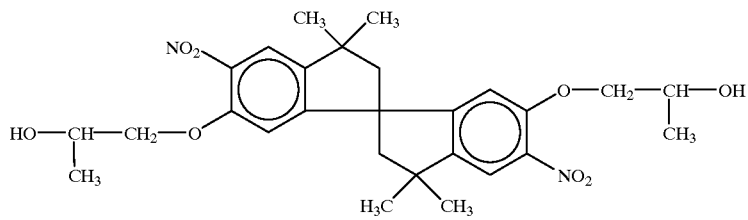

(1-a-3)

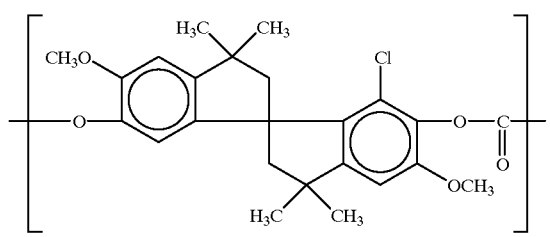

(2-a-3)

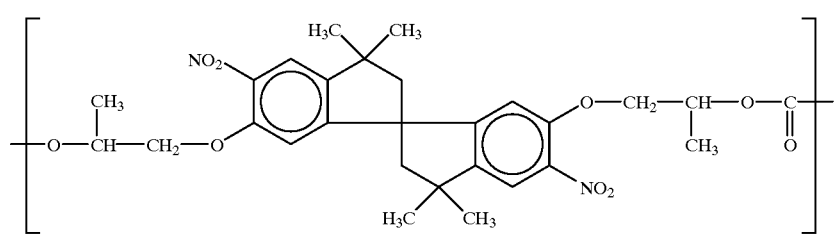

EXAMPLE 6

A polycarbonate copolymer comprising the repeating structural units represented by formulas (1-a-3) and (2-a-3) was prepared as described in Example 2, except that the dihydroxy compounds represented by formulas (1-1) and (2-1) were replaced by the dihydroxy compounds represented by formulas (1-3) and (2-3), respectively.

As described in Example 1, the polycarbonate copolymer was subject to ¹H-NMR analysis, which indicated that a molar ratio of the repeating structural unit represented by formula (1-a-3) to that represented by formula (2-a-3) in the polycarbonate copolymer was 50/50.

Referential Preparation Example 1

In a 500 mL flask equipped with an agitator, a reflux condenser and a dipping phosgene-inlet tube were placed 396 g of the dihydroxy compound represented by formula (2-1) (1.00 mol) and 500 g of dichloromethane. Into the mixture under ice cooling, 207.9 g of carbonyl chloride (2.10 mol) was introduced over 60 min, and the reaction mixture was stirred for additional 2 hours. After completion of the reaction, nitrogen gas was introduced to evaporate excessive carbonyl chloride and hydrogen chloride as a by-product, and dichloromethane was evaporated under a reduced pressure, to give 480 g of the bischloroformate represented by formula (2-1-b).

an aqueous solution. To the aqueous solution, 600 mL of dichloromethane was added to prepare a two-phase mixture. To the stirred two-phase mixture was introduced 59.4 g of phosgene (0.60 mol) at a rate of 9.9 g/min. After introducing phosgene, 0.08 g of triethylamine was added to the reaction mixture, and the mixture was stirred for further 90 min. After stopping stirring, the two layers of the reaction mixture were separated. The dichloromethane layer was neutralized with hydrochloric acid and washed with deionized water until substantially no electrolytes were detected from the aqueous washing. Then, the dichloromethane layer was evaporated to give a polycarbonate copolymer(random copolymer) comprising the repeating structural units represented by formulas (1-a-1) and (3-a-1) as a white powdery solid, whose weight average molecular weight was 51,000.

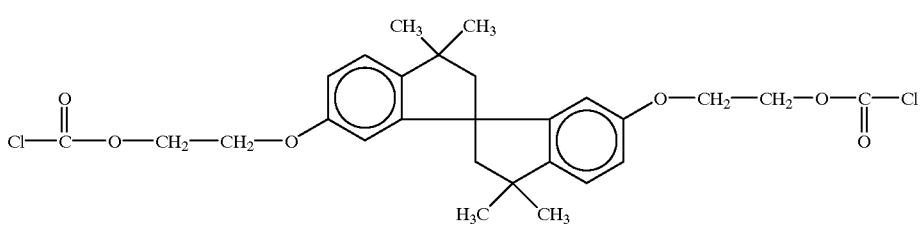

(2-1-b)

EXAMPLE 7

In a 500 mL flask equipped with an agitator and a reflux condenser were placed 52.1 g of the bischloroformate represented by formula (2-1-b)(0.10 mol), 30.8 g of the dihydroxy compound represented by formula (1-1)(0.10 mol), 0.377 g of phenol as a terminator (0.004 mol) and 200 g of dichloromethane. Into the mixture under ice cooling, 23.7 g of pyridine (0.30 mol) was added dropwise over 30 min, and the reaction mixture was stirred at the same temperature for additional 2 hours. After completion of the polymerization reaction, diluted hydrochloric acid was added to the mixture, which was then stirred to remove excessive pyridine. The dichloromethane layer was washed with ion exchanged water until the aqueous washing became neutral, and then separated. Dichloromethane was evaporated from the solution of the polycarbonate copolymer in dichloromethane under a reduced pressure, to give a polycarbonate copolymer (alternating copolymer) comprising the repeating structural units represented by formulas (1-a-1) and (2-a-1) as a colorless solid, whose weight average molecular weight and glass-transition temperature (Tg) were 70,000 and 150° C., respectively. Its melt viscosity at 220° C. was 4,200 poise.

As described in Example 1, the polycarbonate copolymer was subject to $^1$H-NMR analysis, which indicated that a molar ratio of the repeating structural unit represented by formula (1-a-1) to that represented by formula (2-a-1) in the polycarbonate copolymer was 50/50.

EXAMPLE 8

In a 2 L flask having a baffle plate equipped with an agitator with a grid blade, a reflux condenser and a dipping phosgene (carbonyl chloride)-inlet tube were placed 77.1 g of 6,6'-dihydroxy-3,3,3',3'-tetramethyl-1,1'-spirobiindane represented by formula (1-1)(0.25 mol) and 86.6 g of α,α'-bis(4-hydroxyphenyl)-1,3-diisopropylbenzene represented by formula (3-1)(0.25 mol) as starting monomers, 56 g of sodium hydroxide (1.40 mol), 2.58 g of 4-tert-butylphenol as a molecular weight modifier (3.43 mol % to the diol components) and 600 mL of deionized water, to give The copolymer was subject to differential thermal analysis in the range of 0° C. to 300° C. using a scanning calorimeter (DSC-3100, Mac Science) to show a glass-transition temperature (Tg) of 145° C. Its melt viscosity at 240° C. was 4,500 poise.

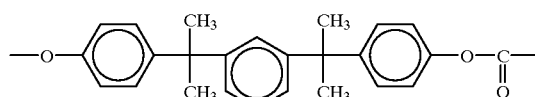

(1-1)

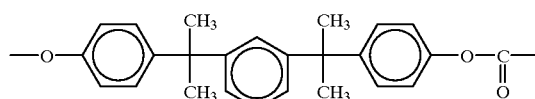

(3-1)

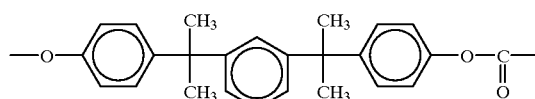

(1-a-1)

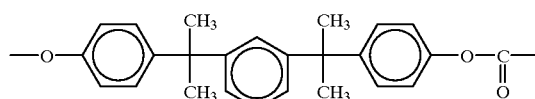

(3-a-1)

The $^1$H NMR results for a 1 wt % solution of the polycarbonate copolymer in CDCl$_3$ were as follows;

$^1$H NMR δ (CDCl$_3$): 1.3(s, 12H), 1.4(s, 12H), 2.3(m, 8H), 3.9–4.5(m, 8H), 6.3–7.2(m, 12H).

An integration ratio of the methyl groups on the spirobiindane rings to those in the isopropylidene groups was determined from the above $^1$H NMR results. Thus, it was found that a molar ratio of the repeating structural unit represented by formula (1-a-1) to that represented by formula (3-a-1) in the polycarbonate copolymer was 50/50.

IR(KBr): 1780 cm$^{-1}$[—O—C(=O)—O—].

EXAMPLE 9

A polycarbonate copolymer (random copolymer) comprising the repeating structural units represented by formulas (1-a-1) and (3-a-1) was prepared as described in Example 8, except that 123.4 g of 6,6'-dihydroxy-3,3,3',3'-tetramethyl-1,1'-spirobiindane (0.40 mol) and 34.7 g of α,α'-bis(4-hydroxyphenyl)-1,3-diisopropylbenzene (0.10 mol) were used as starting monomers and that 471 mg of phenol (0.005 mol; 1 mol % to the diol components) was used as a molecular weight modifier. Its weight average molecular weight and glass-transition temperature (Tg) were 95,000 and 180° C., respectively. Its melt viscosity at 240° C. was 5,500 poise.

As described in Example 8, the polycarbonate copolymer was subject to $^1$H-NMR analysis, which indicated that a molar ratio of the repeating structural unit represented by formula (1-a-1) to that represented by formula (3-a-1) in the polycarbonate copolymer was 80/20.

EXAMPLE 10

A polycarbonate copolymer (random copolymer) comprising the repeating structural units represented by formulas (1-a-1) and (3-a-1) was prepared as described in Example 8, except that 107.9 g of 6,6'-dihydroxy-3,3,3',3'-tetramethyl-1,1'-spirobiindane (0.35 mol) and 52.0 g of α,α'-bis(4-hydroxyphenyl)-1,3-diisopropylbenzene (0.15 mol) were used as starting monomers and that 941 mg of phenol(0.010 mol; 2 mol % to the diol components) was used as a molecular weight modifier. Its weight average molecular weight and glass-transition temperature (Tg) were 65,000 and 170° C., respectively. Its melt viscosity at 240° C. was 1,500 poise.

As described in Example 8, the polycarbonate copolymer was subject to $^1$H-NMR analysis, which indicated that a molar ratio of the repeating structural unit represented by formula (1-a-1) to that represented by formula (3-a-1) in the polycarbonate copolymer was 70/30.

EXAMPLE 11

A polycarbonate copolymer (random copolymer) comprising the repeating structural units represented by formulas (1-a-1) and (3-a-1) was prepared as described in Example 8, except that 92.5 g of 6,6'-dihydroxy-3,3,3',3'-tetramethyl-1,1'-spirobiindane (0.30 mol) and 69.3 g of α,α'-bis(4-hydroxyphenyl)-1,3-diisopropylbenzene (0.20 mol) were used as starting monomers and that 706 mg of phenol (0.0075 mol; 1.5 mol % to the diol components) was used as a molecular weight modifier. Its weight average molecular weight and glass-transition temperature (Tg) were 80,000 and 155° C., respectively. Its melt viscosity at 240° C. was 3,000 poise.

As described in Example 8, the polycarbonate copolymer was subject to $^1$H-NMR analysis, which indicated that a molar ratio of the repeating structural unit represented by formula (1-a-1) to that represented by formula (3-a-1) in the polycarbonate copolymer was 60/40.

EXAMPLE 12

A polycarbonate copolymer (random copolymer) comprising the repeating structural units represented by formulas (1-a-1) and (3-a-1) was prepared as described in Example 8, except that 38.55 g of 6,6'-dihydroxy-3,3,3',3'-tetramethyl-1,1'-spirobiindane (0.125 mol) and 129.9 g of α,α'-bis(4-hydroxyphenyl)-1,3-diisopropylbenzene (0.375 mol) were used as starting monomers and that 1412 mg of phenol (0.015 mol; 3.0 mol % to the diol components) was used as a molecular weight modifier. Its weight average molecular weight and glass-transition temperature (Tg) were 38,000 and 155° C., respectively. Its melt viscosity at 240° C. was 3,000 poise.

As described in Example 1, the polycarbonate copolymer was subject to $^1$H-NMR analysis, which indicated that a molar ratio of the repeating structural unit represented by formula (1-a-1) to that represented by formula (3-a-1) in the polycarbonate copolymer was 25/75.

Referential Preparation Example 2

In a 2 L flask equipped with an agitator, a reflux condenser and a dipping phosgene-inlet tube were placed 308 g of 6,6'-dihydroxy-3,3,3',3'-tetramethyl-1,1'-spirobiindane (1.00 mol) and 500 g of toluene. Into the mixture under ice cooling, 207.9 g of carbonyl chloride (2.10 mol) was introduced over 60 min, and then 313.4 g of N,N-diethylaniline (2.10 mol) was added dropwise over 2 hours. The reaction mixture was stirred under ice cooling for additional 2 hours, and then, nitrogen gas was introduced to evaporate excessive carbonyl chloride. The reaction solution was filtered to remove N,N-diethylaniline hydrochloride, and then the filtrate was washed with 500 g of diluted hydrochloric acid twice and separated to remove the remaining N,N-diethylainiline. The organic layer was repeatedly washed with pure water until the aqueous washing became neutral. Toluene was evaporated under a reduced pressure to give a solid, which was then recrystallized from hexane, to give 380 g of bischloroformate of 6,6'-dihydroxy-3,3,3',3'-tetramethyl-1,1'-spirobiindane represented by formula (1-1-a).

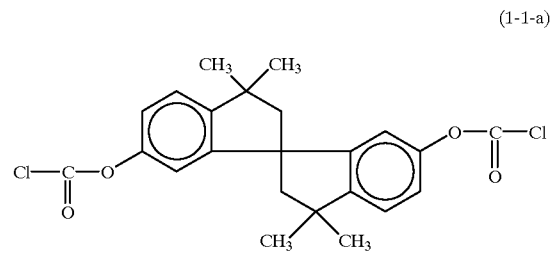

(1-1-a)

EXAMPLE 13

In a 500 mL flask equipped with an agitator and a reflux condenser were placed 34.65 g of α,α'-bis(4-hydroxyphenyl)-1,3-diisopropylbenzene (0.10 mol), 376 mg of phenol as a terminator (0.004 mol; 2 mol % to the diol component), 23.73 g of pyridine (0.03 mol) and 100 g of dichloromethane. To the mixture under ice cooling was added dropwise over 1 hour a solution of 43.34 g of the bischloroformate (0.10 mol) represented by formula (1-1-a)

prepared in Referential Preparation Example 2 in dichloromethane (100 g), and the resulting mixture was stirred at the same temperature for 2 hours. After completion of the polymerization reaction, 300 g of 5% hydrochloric acid was added to the mixture, which was then stirred to remove excessive pyridine into the aqueous layer as a hydrochloride. The dichloromethane layer was washed with ion exchanged water until the aqueous washing became neutral, and then separated. Dichloromethane was evaporated from the solution of the polycarbonate copolymer in dichloromethane, to give a polycarbonate copolymer (alternating copolymer) comprising the repeating structural units represented by formulas (1-a-1) and (3-a-1) as a colorless solid, whose weight average molecular weight and glass-transition temperature (Tg) were 45,000 and 150° C., respectively. Its melt viscosity at 240° C. was 4,200 poise.

As described in Example 8, the polycarbonate copolymer was subject to $^1$H-NMR analysis, which indicated that a molar ratio of the repeating structural unit represented by formula (1-a-1) to that represented by formula (3-a-1) in the polycarbonate copolymer was 50/50.

EXAMPLE 14

A polycarbonate copolymer comprising the repeating structural units represented by formulas (1-a-2) and (3-a-2) was prepared as described in Example 8, except that 6,6'-dihydroxy-3,3,3',3'-tetramethyl-1,1'-spirobiindane and α,α'-bis(4-hydroxyphenyl)-1,3-diisopropylbenzene were replaced by 6,6'-dihydroxy-3,3,3',3',5,5',7,7'-octamethyl-1,1'-spirobiindane and α,α'-bis(4-hydroxyphenyl)-1,4-diisopropylbenzene, respectively.

As described in Example 1, the polycarbonate copolymer was subject to $^1$H-NMR analysis, which indicated that a molar ratio of the repeating structural unit represented by formula (1-a-2) to that represented by formula (3-a-2) in the polycarbonate copolymer was 50/50.

Its weight average molecular weight, glass-transition temperature (Tg) and melt viscosity at 240° C. were 45,000, 135° C. and 5,000 poise, respectively.

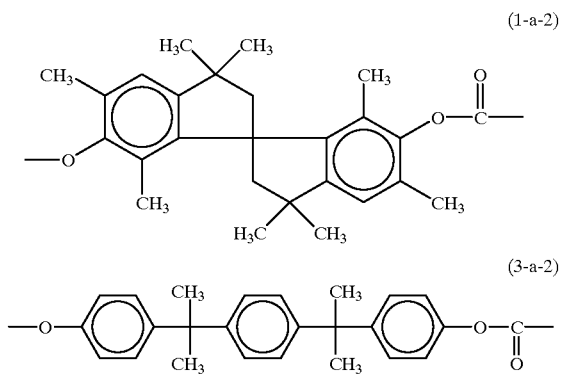

EXAMPLE 15

A polycarbonate copolymer comprising the repeating structural units represented by formulas (1-a-3) and (3-a-3) was prepared as described in Example 8, except that 6,6'-dihydroxy-3,3,3',3'-tetramethyl-1,1'-spirobiindane and α,α'-bis(4-hydroxyphenyl)-1,3-diisopropylbenzene were replaced by 6,6'-dihydroxy-5,5'-difluoro-3,3,3',3'-tetramethyl-1,1'-spirobiindane and α,α'-bis(4-hydroxy-2-methylphenyl)-1,3-diisopropylbenzene, respectively.

As described in Example 8, the polycarbonate copolymer was subject to $^1$H-NMR analysis, which indicated that a molar ratio of the repeating structural unit represented by formula (1-a-3) to that represented by formula (3-a-3) in the polycarbonate copolymer was 50/50.

Its weight average molecular weight, glass-transition temperature (Tg) and melt viscosity at 240° C. were 55,000, 140° C. and 4,500 poise, respectively.

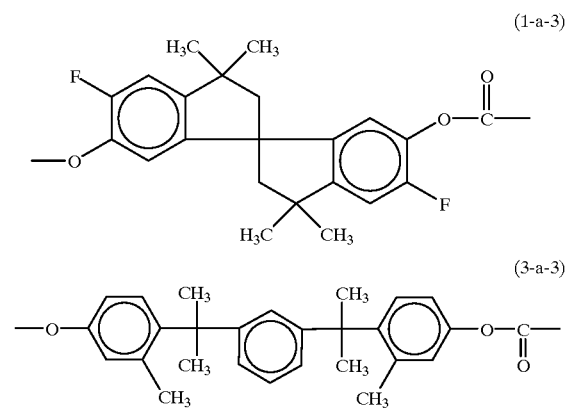

EXAMPLE 16

A polycarbonate copolymer comprising the repeating structural units represented by formulas (1-a-4) and (3-a-4) was prepared as described in Example 8, except that 6,6'-dihydroxy-3,3,3',3'-tetramethyl-1,1'-spirobiindane and α,α'-bis(4-hydroxyphenyl)-1,3-diisopropylbenzene were replaced by 6,6'-dihydroxy-5,5'-dimethoxy-3,3,3',3'-tetramethyl-1,1'-spirobiindane and α,α'-bis(4-hydroxy-3-fluorophenyl)-1,3-diisopropylbenzene, respectively.

As described in Example 8, the polycarbonate copolymer was subject to $^1$H-NMR analysis, which indicated that a molar ratio of the repeating structural unit represented by formula (1-a-4) to that represented by formula (3-a-4) in the polycarbonate copolymer was 50/50.

Its weight average molecular weight, glass-transition temperature (Tg) and melt viscosity at 240° C. were 55,000, 135° C. and 3,000 poise, respectively.

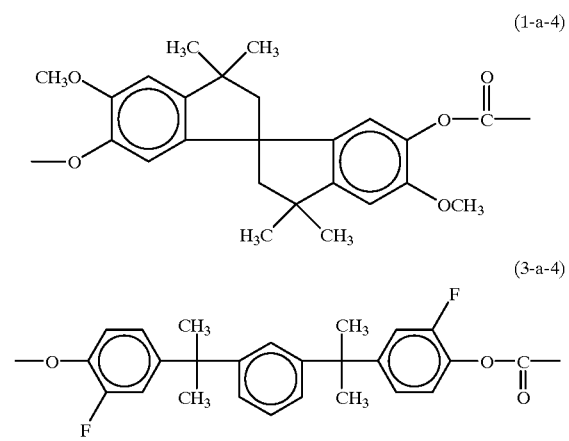

EXAMPLE 17

A polycarbonate copolymer comprising the repeating structural units represented by formulas (1-a-5) and (3-a-5)

was prepared as described in Example 8, except that 6,6'-dihydroxy-3,3,3',3'-tetramethyl-1,1'-spirobiindane and α,α'-bis(4-hydroxyphenyl)-1,3-diisopropylbenzene were replaced by 6,6'-dihydroxy-5,5'-dinitro-3,3,3',3'-tetramethyl-1,1'-spirobiindane and α,α'-bis(4-hydroxy-2-methoxyphenyl)-1,3-diisopropylbenzene, respectively.

As described in Example 8, the polycarbonate copolymer was subject to $^1$H-NMR analysis, which indicated that a molar ratio of the repeating structural unit represented by formula (1-a-5) to that represented by formula (3-a-5) in the polycarbonate copolymer was 50/50.

Its weight average molecular weight, glass-transition temperature (Tg) and melt viscosity at 240° C. were 55,000, 130° C. and 3,500 poise, respectively.

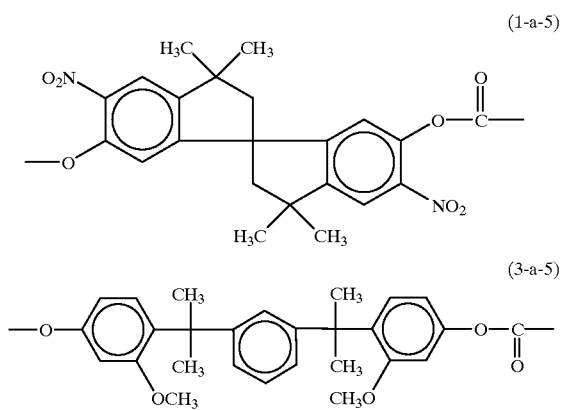

Comparative Example 1

A known polycarbonate was prepared from bisphenol A and phosgene according to a usual interfacial polymerization process.

In a 2 L flask having a baffle plate equipped with an agitator with a grid blade, a reflux condenser and a dipping phosgene-inlet tube were placed 114 g of bisphenol A (0.50 mol), 56 g of sodium hydroxide (1.40 mol), 2.58 g of 4-tert-butylphenol and 600 mL of deionized water, to give an aqueous solution. To the aqueous solution, 600 mL of dichloromethane was added to prepare a two-phase mixture. To the stirred two-phase mixture was introduced 59.4 g of carbonyl chloride (0.60 mol) at a rate of 9.9 g/min. After introducing carbonyl chloride, 0.08 g of triethylamine was added to the reaction mixture, and the mixture was stirred for further 90 min. After stopping stirring, the two layers of the reaction mixture were separated. The dichloromethane layer was neutralized with hydrochloric acid and washed with deionized water until substantially no electrolytes were detected from the aqueous washing. Then, the dichloromethane layer was evaporated to give an aromatic polycarbonate as a solid. Its weight average molecular weight and melt viscosity at 300° C. were 51,000 and 5,400 poise, respectively.

Comparative Example 2

A polycarbonate copolymer was prepared from bisphenol A and spirobiindanol according to Example 7 in U.S. Pat. No. 4,950,731, whose weight average molecular weight and melt viscosity at 280° C. were 44,800 and 4,800 poise, respectively.

It was observed that the polycarbonate copolymer of this invention prepared in each of Examples showed an equivalent melt viscosity (a level of several thousand poise) at a lower temperature by about 60 to 80° C. in comparison with the known polycarbonates of bisphenol A prepared in Comparative Examples, and had good melt fluidity and moldability.

Comparative Example 3

A polycarbonate copolymer was prepared from bisphenol A and spirobiindanol according to Example 1 in JP-A HEI7-330884, which is substantially alternating copolymer.

Its weight average molecular weight, glass-transition temperature (Tg) and melt viscosity at 280° C. were 45,000, 179° C. and 4,500 poise, respectively.

Comparative Example 4

A homo-polycarbonate copolymer was prepared from spirobiindanol according to Example 9 in U.S. Pat. No. 4,950,731.

Its weight average molecular weight, glass-transition temperature (Tg) and melt viscosity at 300° C. were 57,000, 228° C. and 4,500 poise, respectively. The polycarbonate was press-molded to form a test sheet 1.2 mm in thickness for evaluation described later. As the sheet was extremely fragile, the sheet were broken.

Evaluation Procedure

Each of the polymers prepared in Examples and Comparative Examples was press-molded to form a test sheet 1.2 mm in thickness. The sheet was evaluated for the following properties. The results are shown in Table 2.

(1) Appearance:

Transparency and optical surface status of a test sheet was visually observed and evaluated.

◯: colorless and transparent, and good surface status without splits, cracks or rough surface ×: having splits, cracks or rough surface (2) Total light transmittance (hereinafter, referred to as "transmittance"): determined according to ASTMD-1003

(3) Birefringence: determined according to a Babinet compensator technique with a precision strain meter(Toshiba Glass K.K.; SVP-30-II)

(4) Heat resistance: evaluated based on visual observation for a test sheet after placing it in a hot-air drier at 120° C. for 4 hours.

◯: no staining, surface distortion or cracks of the molding

×: having staining, surface distortion or cracks of the molding

TABLE 2

| Example | Appearance | Transmittance (%) | Birefringence (nm) | Heat resistance |
|---|---|---|---|---|
| Ex. 1 | ◯ | 91 | 9 | ◯ |
| Ex. 2 | ◯ | 90 | 9 | ◯ |
| Ex. 3 | ◯ | 90 | 9 | ◯ |
| Ex. 4 | ◯ | 90 | 9 | ◯ |
| Ex. 5 | ◯ | 89 | 11 | ◯ |
| Ex. 6 | ◯ | 89 | 11 | ◯ |
| Ex. 7 | ◯ | 91 | 9 | ◯ |
| Ex. 8 | ◯ | 91 | 14 | ◯ |
| Ex. 9 | ◯ | 91 | 15 | ◯ |
| Ex. 10 | ◯ | 90 | 15 | ◯ |
| Ex. 11 | ◯ | 90 | 15 | ◯ |
| Ex. 12 | ◯ | 90 | 16 | ◯ |
| Ex. 13 | ◯ | 91 | 15 | ◯ |

TABLE 2-continued

| Example | Appearance | Transmittance (%) | Birefringence (nm) | Heat resistance |
|---|---|---|---|---|
| Ex. 14 | ◯ | 90 | 15 | ◯ |
| Ex. 15 | ◯ | 90 | 15 | ◯ |
| Ex. 16 | ◯ | 89 | 15 | ◯ |
| Ex. 17 | ◯ | 90 | 15 | ◯ |
| Comp. Ex. 1 | ◯ | 90 | 44 | ◯ |
| Comp. Ex. 2 | X | 88 | 22 | X |
| Comp. Ex. 3 | X | 88 | 20 | X |

As seen in Tables 2-1 and 2-2, a molding from the polycarbonate copolymer of this invention has excellent transparency and heat resistance, and a lower birefringence.

EXAMPLE 18

(Preparation and Evaluation of an Optical Disk)

The polycarbonate copolymer prepared in Example 1 was formed into a pellet with an extruder equipped with a pelletizer (cylinder temperature: 230° C.). The pellet was dried at 110° C. for 4 hours, and then was subject to injection molding at 260° C.; specifically, a stamper with a mirror surface was mounted on a mold and the material was formed into a disk-shape molding with an outer diameter of 130 mm and a thickness of 1.2 mm.

The center part of the substrate was punched to provide a doughnut disk with an inner diameter of 15 mm, and then aluminum was vacuum-deposited on one side of the substrate to form a reflective layer with a thickness of 600 Å. For the optical disk, a birefringence and a BER (bit error rate) were determined.

The bit error rate was determined based on an incidence of record-reading error, using a laser beam with a wavelength of 780 nm, a linear velocity of 2 m/sec and a power of 0.8 mW.

The results are shown in Table 3.

EXAMPLES 19 to 24

Optical disks were prepared and evaluated as described in Example 18, except that the polycarbonate copolymers prepared in Examples 2 to 7 were used.

The results are shown in Table 3.

EXAMPLE 25

(Preparation and Evaluation of an Optical Disk)

The polycarbonate copolymer prepared in Examples 8 was formed into a pellet with an extruder equipped with a pelletizer (cylinder temperature: 240° C.). The pellet was dried at 110° C. for 4 hours, and then was subject to injection molding at 290° C.; specifically, a stamper with a mirror surface was mounted on a mold and the material was formed into a disk-shape molding with an outer diameter of 130 mm and a thickness of 1.2 mm.

The center part of the substrate was punched to provide a doughnut disk with an inner diameter of 15 mm, and then aluminum was vacuum-deposited on one side of the substrate to form a reflective layer with a thickness of 600 Å. For the optical disk, a birefringence and a BER (bit error rate) were determined.

The bit error rate was determined based on an incidence of record-reading error, using a laser beam with a wavelength of 780 nm, a linear velocity of 2 m/sec and a power of 0.8 mW.

The results are shown in Table 3.

EXAMPLES 26 to 34

Optical disks were prepared and evaluated as described in Example 25, except that the polycarbonate copolymers prepared in Examples 9 to 17 were used.

The results are shown in Table 3.

Comparative Example 5

An optical disk was prepared as described in the above Example, except that the polycarbonate prepared in Comparative Example 1 was used and injection molding was conducted at 340° C. For the optical disk, a birefringence and a BER (bit error rate) were determined. The results are shown in Tables 3.

Comparative Example 6

An optical disk was prepared as described in the above Example, except that the polycarbonate prepared in Comparative Example 2 was used and injection molding was conducted at 320° C. For the optical disk, a birefringence and a BER (bit error rate) were determined. The results are shown in Tables 3.

Comparative Example 7

An optical disk was prepared as described in the above Example, except that the polycarbonate prepared in Comparative Example 3 was used and injection molding was conducted at 320° C. For the optical disk, a birefringence and a BER (bit error rate) were determined. The results are shown in Tables 3.

TABLE 3

| | Birefringence (Δnd, single pass) (nm) | BER (bit error rate) |
|---|---|---|
| Ex. 18 | 6 | $3 \times 10^{-6}$ |
| Ex. 19 | 6 | $2 \times 10^{-6}$ |
| Ex. 20 | 6 | $3 \times 10^{-6}$ |
| Ex. 21 | 6 | $2 \times 10^{-6}$ |
| Ex. 22 | 7 | $4 \times 10^{-6}$ |
| Ex. 23 | 7 | $4 \times 10^{-6}$ |
| Ex. 24 | 5 | $2 \times 10^{-6}$ |
| Ex. 25 | 11 | $6 \times 10^{-6}$ |
| Ex. 26 | 11 | $5 \times 10^{-6}$ |
| Ex. 27 | 11 | $6 \times 10^{-6}$ |
| Ex. 28 | 11 | $5 \times 10^{-6}$ |
| Ex. 29 | 12 | $7 \times 10^{-6}$ |
| Ex. 30 | 12 | $7 \times 10^{-6}$ |
| Ex. 31 | 12 | $7 \times 10^{-6}$ |
| Ex. 32 | 12 | $7 \times 10^{-6}$ |
| Ex. 33 | 10 | $5 \times 10^{-6}$ |
| Ex. 34 | 10 | $5 \times 10^{-6}$ |
| Comp. Ex. 5 | 40 | $5 \times 10^{-5}$ |
| Comp. Ex. 6 | 18 | $2 \times 10^{-5}$ |
| Comp. Ex. 7 | 17 | $1 \times 10^{-5}$ |

As seen in Tables 3, an optical disk from the polycarbonate of this invention has a reduced birefringence and therefore an improved BER in comparison with an optical disk from a known polycarbonate.

EXAMPLE 35

(Preparation of a Magneto-Optical Disk and Evaluation of its Recording Properties)

The polycarbonate copolymer prepared in Example 1 was formed into a pellet with an extruder equipped with a pelletizer (cylinder temperature: 230° C.). The pellet was dried at 110° C. for 4 hours, and then was subject to injection molding; specifically, a stamper with a mirror surface was mounted on a mold and the material was formed into a disk-shape molding (substrate) with an outer diameter of 130 mm and a thickness of 1.2 mm.

On the substrate was deposited a magneto-optical recording layer with a thickness of 1000 Å in a sputtering instrument (RF sputtering instrument; Nippon Shinku), using an alloy target of Tb 23.5, Fe 64.2 and Co 12.3 (atomic %). On the recording layer was deposited an inorganic-glass protective film with a thickness of 1000 Å using a sputtering instrument as described above. For the magneto-optical disk, a birefringence, a CN ratio, a BER (bit error rate) and a CN retention rate were determined.

The CN ratio was determined under the conditions; a writing power: 7 mW, a reading power: 1 mw, a carrier frequency: 1 MHz, and a resolution band width: 30 KHz.

The CN retention rate was determined as a percentage (%) of reduction in the CN ratio compared with the initial CN ratio after 30 days under the conditions; temperature: 60° C. and RH: 90%.

The results are shown in Table 4.

EXAMPLES 36 to 41

Magneto-optical disks were prepared as described in Example 35, except that the polycarbonate copolymers prepared in Examples 2 to 7 were used. For the magneto-optical disks, a birefringence, a CN ratio, a BER (bit error rate) and a CN retention rate were determined. The results are shown in Table 4.

EXAMPLE 42

(Preparation of a Magneto-Optical Disk and Evaluation of its Recording Properties)

The polycarbonate copolymer prepared in Example 8 was formed into a pellet with an extruder equipped with a pelletizer (cylinder temperature: 230° C.). The pellet was dried at 110° C. for 4 hours, and then was subject to injection molding; specifically, a stamper with a mirror surface was mounted on a mold and the material was formed into a disk-shape molding(substrate) with an outer diameter of 130 mm and a thickness of 1.2 mm.

On the substrate was deposited a magneto-optical recording layer with a thickness of 1000 Å in a sputtering instrument (RF sputtering instrument; Nippon Shinku), using an alloy target of Tb 23.5, Fe 64.2 and Co 12.3 (atomic %). On the recording layer was deposited an inorganic-glass protective film with a thickness of 1000 Å using a sputtering instrument as described above. For the magneto-optical disk, a birefringence, a CN ratio, a BER (bit error rate) and a CN retention rate were determined.

The CN ratio was determined under the conditions; a writing power: 7 mW, a reading power: 1 mW, a carrier frequency: 1 MHz, and a resolution band width: 30 KHz.

The CN retention rate was determined as a percentage (%) of reduction in the CN ratio compared with the initial CN ratio after 30 days under the conditions; temperature: 60° C. and RH: 90%.

The results are shown in Table 4.

EXAMPLES 43 to 51

Magneto-optical disks were prepared as described in Example 42, except that the polycarbonate copolymers prepared in Examples 9 to 17 were used. For the magneto-optical disks, a birefringence, a CN ratio, a BER (bit error rate) and a CN retention rate were determined. The results are shown in Table 4-2.

Comparative Example 8

A magneto-optical disk was prepared as described in the above Example, except that the polycarbonate prepared in Comparative Example 1 was used. For the magneto-optical disk, a birefringence, a CN ratio, a BER (bit error rate) and a CN retention rate were determined. The results are shown in Tables 4.

Comparative Example 9

A magneto-optical disk was prepared as described in the above Example, except that the polycarbonate prepared in Comparative Example 2 was used. For the magneto-optical disk, a birefringence, a CN ratio, a BER (bit error rate) and a CN retention rate were determined. The results are shown in Tables 4.

Comparative Example 10

A magneto-optical disk was prepared as described in the above Example, except that the polycarbonate prepared in Comparative Example 3 was used. For the magneto-optical disk, a birefringence, a CN ratio, a BER (bit error rate) and a CN retention rate were determined. The results are shown in Tables 4.

TABLE 4

|  | Birefringence (Δnd, single pass) (nm) | CN (dB) | BER (bit error rate) | CN retention rate (%) |
|---|---|---|---|---|
| Ex. 35 | 6 | 56 | $2 \times 10^{-6}$ | 94 |
| Ex. 36 | 6 | 55 | $3 \times 10^{-6}$ | 95 |
| Ex. 37 | 5 | 54 | $2 \times 10^{-6}$ | 95 |
| Ex. 38 | 6 | 55 | $2 \times 10^{-6}$ | 95 |
| Ex. 39 | 7 | 53 | $4 \times 10^{-6}$ | 93 |
| Ex. 40 | 7 | 53 | $4 \times 10^{-6}$ | 93 |
| Ex. 41 | 6 | 55 | $2 \times 10^{-6}$ | 95 |
| Ex. 42 | 9 | 52 | $5 \times 10^{-6}$ | 92 |
| Ex. 43 | 9 | 52 | $6 \times 10^{-6}$ | 93 |
| Ex. 44 | 8 | 51 | $5 \times 10^{-6}$ | 93 |
| Ex. 45 | 9 | 52 | $5 \times 10^{-6}$ | 93 |
| Ex. 46 | 10 | 51 | $7 \times 10^{-6}$ | 92 |
| Ex. 47 | 10 | 51 | $7 \times 10^{-6}$ | 92 |
| Ex. 48 | 10 | 51 | $7 \times 10^{-6}$ | 92 |
| Ex. 49 | 10 | 51 | $7 \times 10^{-6}$ | 92 |
| Ex. 50 | 9 | 52 | $5 \times 10^{-6}$ | 93 |
| Ex. 51 | 9 | 52 | $5 \times 10^{-6}$ | 93 |
| Comp. Ex. 8 | 20 | 46 | $5 \times 10^{-5}$ | 85 |
| Comp. Ex. 9 | 14 | 48 | $2 \times 10^{-5}$ | 90 |
| Comp. Ex. 10 | 14 | 48 | $1 \times 10^{-5}$ | 90 |

As seen in Tables 4, a magneto-optical disk from the polycarbonate of this invention has a reduced birefringence and therefore improved CN ratio, BER and CN retention rate in comparison with a magneto-optical disk from a known polycarbonate.

What is claimed is:

1. A polycarbonate copolymer comprising the repeating structural unit represented by general formula (1-a) and at least one of the repeating structural units represented by general formulas (2-a) and (3-a);

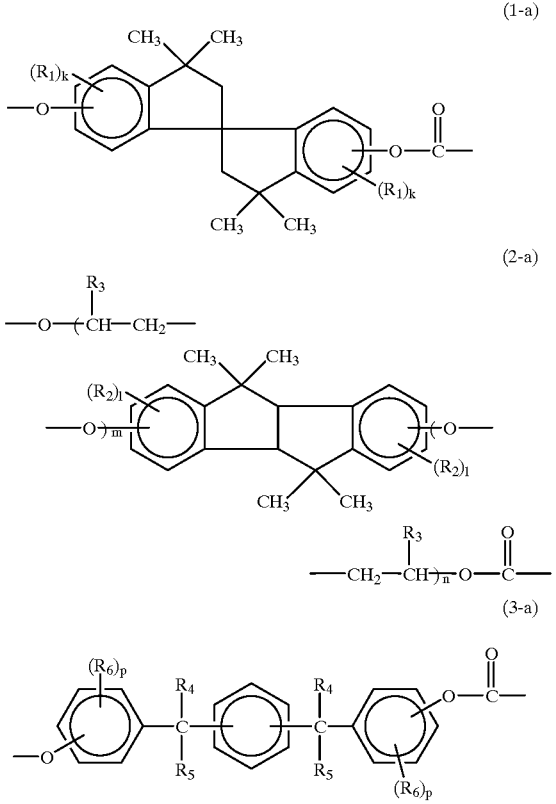

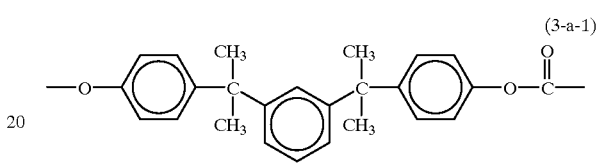

wherein $R_1$ and $R_2$ are independently an alkyl, an alkoxy, nitro or a halogen atom; $R_3$ is hydrogen or methyl; $R_4$ and $R_5$ are independently hydrogen or an alkyl; $R_6$ is independently an alkyl, an alkoxy or a halogen atom; k and l are independently an integer of 0 to 3; m and n are independently an integer of 0 to 20; and p is independently an integer of 0 to 2, although m+n is not 0.

2. A polycarbonate copolymer as claimed in claim 1 comprising the repeating structural units represented by general formulas (1-a) and (2-a), where the repeating structural unit represented by (2-a) is contained in a proportion of 5 to 90 mol % in the total repeating structural units represented by general formulas (1-a) and (2-a).

3. A polycarbonate copolymer as claimed in claim 1 comprising the repeating structural units represented by general formulas (1-a) and (3-a), where the repeating structural unit represented by (1-a) is contained in a proportion of 5 to 90 mol % in the total repeating structural units represented by general formulas (1-a) and (3-a).

4. A polycarbonate copolymer as claimed in any of claim 3 whose weight average molecular weight is 10,000 to 150,000.

5. A polycarbonate copolymer as claimed in claim 2 where k is 0 in general formula (1-a) and l is 0 in general formula (2-a).

6. A polycarbonate copolymer as claimed in claim 3 where k is 0 in general formula (1-a) and the repeating structural unit of general formula (3-a) is represented by formula (3-a-1).

7. An optical component comprising a polycarbonate copolymer as claimed in claim 6.

8. A polycarbonate copolymer as claimed in claim 2 whose weight average molecular weight is 10,000 to 150,000.

9. A polycarbonate copolymer as claimed in claim 1 whose weight average molecular weight is 10,000 to 150,000.

10. An optical component comprising a polycarbonate copolymer as claimed in claim 5.

11. An optical component comprising a polycarbonate copolymer as claimed in claim 4.

12. An optical component comprising a polycarbonate copolymer as claimed in claim 3.

13. An optical component comprising a polycarbonate copolymer as claimed in claim 2.

14. An optical component comprising a polycarbonate copolymer as claimed in claim 1.

15. An optical component comprising a polycarbonate copolymer as claimed in claim 9.

16. An optical component comprising a polycarbonate copolymer as claimed in claim 8.

* * * * *